United States Patent
Liu et al.

(10) Patent No.: US 12,509,520 B2
(45) Date of Patent: Dec. 30, 2025

(54) ANTI-CD3 AND ANTI-CD123 BISPECIFIC ANTIBODY AND USE THEREOF

(71) Applicants: Beijing Wisdomab Biotechnology Co., Ltd, Beijing (CN); Genrix (Shanghai) Biopharmaceutical Co., Ltd., Shanghai (CN); Chongqing Genrix Biopharmaceutical Co., Ltd., Chongqing (CN)

(72) Inventors: Zhigang Liu, Beijing (CN); Xiaobo Hao, Beijing (CN); Xueping Zhang, Beijing (CN); Yulan Liu, Beijing (CN); Jingjing Guo, Beijing (CN)

(73) Assignees: Beijing Wisdomab Biotechnology Co., Ltd, Beijing (CN); Genrix (Shanghai) Biopharmaceutical Co., Ltd., Shanghai (CN); Chongqing Genrix Biopharmaceutical Co., Ltd., Chongqing (CN)

( * ) Notice: Subject to any disclaimer, the term of this patent is extended or adjusted under 35 U.S.C. 154(b) by 738 days.

(21) Appl. No.: 17/797,656

(22) PCT Filed: Mar. 30, 2020

(86) PCT No.: PCT/CN2020/082151
§ 371 (c)(1),
(2) Date: Aug. 4, 2022

(87) PCT Pub. No.: WO2021/155635
PCT Pub. Date: Aug. 12, 2021

(65) Prior Publication Data
US 2023/0071422 A1 Mar. 9, 2023

(30) Foreign Application Priority Data
Feb. 5, 2020 (CN) .......................... 202010080449.9

(51) Int. Cl.
*C07K 16/28* (2006.01)
*A61K 39/00* (2006.01)
*A61P 35/00* (2006.01)
*A61P 35/02* (2006.01)

(52) U.S. Cl.
CPC .......... *C07K 16/2866* (2013.01); *A61P 35/00* (2018.01); *A61P 35/02* (2018.01); *C07K 16/2809* (2013.01); *A61K 2039/505* (2013.01); *C07K 2317/24* (2013.01); *C07K 2317/31* (2013.01); *C07K 2317/53* (2013.01); *C07K 2317/55* (2013.01); *C07K 2317/565* (2013.01); *C07K 2317/622* (2013.01); *C07K 2317/92* (2013.01)

(58) Field of Classification Search
None
See application file for complete search history.

(56) References Cited

U.S. PATENT DOCUMENTS

| | | | |
|---|---|---|---|
| 2014/0178364 A1 | 6/2014 | Vairo | |
| 2016/0200827 A1 | 7/2016 | Bonvini | |
| 2017/0291949 A1 | 10/2017 | Zhou | |
| 2017/0327571 A1 | 11/2017 | Zhigang | |
| 2017/0327579 A1* | 11/2017 | Vu | .......................... A61P 43/00 |
| 2019/0071513 A1 | 3/2019 | Hernandez-Hoyos | |
| 2019/0241657 A1* | 8/2019 | Albrecht | .................. A61P 35/00 |

FOREIGN PATENT DOCUMENTS

| | | |
|---|---|---|
| CN | 105315371 A | 2/2016 |
| CN | 105873607 A | 8/2016 |
| CN | 107868792 A | 4/2018 |
| CN | 109627339 A | 4/2019 |
| CN | 109715665 A | 5/2019 |
| CN | 109810195 A | 5/2019 |
| CN | 109952112 A | 6/2019 |
| CN | 110172100 A | 8/2019 |
| CN | 110229232 A | 9/2019 |
| CN | 111171155 A | 5/2020 |
| CN | 111171155 B | 2/2021 |
| WO | WO 2016/116626 A1 | 7/2016 |
| WO | WO 2017/210443 A1 | 12/2017 |
| WO | WO 2018/015340 A1 | 1/2018 |
| WO | WO-2018176992 A1 * 10/2018 ......... C07K 16/2809 |
| WO | WO 2019/072864 A1 | 4/2019 |
| WO | WO-2020001344 A1 * 1/2020 ......... C07K 16/2809 |

OTHER PUBLICATIONS

Bode. Cancer prevention research—then and now. Nat Rev; 9:508-516. (Year: 2009).*
Umar. Future directions in cancer prevention. Nat Rev; 12:835-848. (Year: 2012).*
Sarfati. Preventing cancer: the only way forward. The Lancet; 400:540-541. (Year: 2022).*
Kaczmarek. Cancer Vaccine Therapeutics: Limitations and Effectiveness—A Literature Review. Cells; 12:1-27. (Year: 2023).*
International Search Report and Written Opinion of International Searching Authority for International Application No. PCT/CN2020/082151, with English translations, mailed Nov. 6, 2020 (23 pages).
Hongyan Liu et al.; "Fc Engineering for Developing Therapeutic Bispecific Antibodies and Novel Scaffolds"; Frontiers in Immunology, vol. 8, Article 38, pp. 1-5; Jan. 26, 2017; DOI: 10.3389/fimmu.2017.00038 (15 pages).

(Continued)

*Primary Examiner* — Daniel E Kolker
*Assistant Examiner* — Maureen Varina Driscoll
(74) *Attorney, Agent, or Firm* — NIXON PEABODY LLP; Bradley M. Taub; Nicole D. Kling

(57) ABSTRACT

A bispecific antibody having an antigen-binding portion for human CD3E and/or an antigen-binding portion for human CD123. Medical and biological uses of the bispecific antibody are also disclosed.

18 Claims, 7 Drawing Sheets
Specification includes a Sequence Listing.

(56) References Cited

OTHER PUBLICATIONS

Kabat, E. et al. ; "Sequences of Proteins of Immunological Interest: vol. 1; Fifth Edition"; U.S. Dept. of Health and Human Services; Jun. 5, 1999; NIH Publication No. 91-3242 (1,251 pages).
Al-Lazikani, B. et al.; "Standard Conformations for the Canonical Structures of Immunoglobulins"; J. Mol. Biol. vol. 273, pp. 927-948; Aug. 6, 1997; 0022-2836/97/440927-22 (22 pages).
Martin, A. C. R. et al.; "Modeling antibody hypervariable loops: A combined algorithm"; Proc. Natl. Acad. Sci. USA, vol. 86, pp. 9268-9272; Dec. 1989 (5 pages).
Testa, U. et al.; "CD 123 is a membrane biomarker and a therapeutic target in hematologic malignancies"; Biomarker Research, vol. 2, No. 4; 2014; DOI: 10.1186/2050-771-2-4 (11 pages).
Munoz, L. et al.; "Interleukin-3 receptor α chain (CD123) is widely expressed in hematologic malignancies"; Haematologica, vol. 86, No. 12, pp. 1261-1269; http://www.haematologica.it/2001_12/1261.htm; Dec. 2001 (9 pages).
Testa, U. et al.; "Elevated expression of IL-3 Rα in acute myelogenous leukemia is associated with enhanced blast proliferation, increased cellularity, and poor prognosis"; Blood, vol. 100, No. 8, pp. 2980-2988; Jun. 14, 2002; DOI: 10.1182/blood-2002-03-0852 (10 pages).
Merchant, A. M. et al.; "An efficient route to human bispecific IgG"; Nature Biotechnology, vol. 16, pp. 677-681; Jul. 1998 (5 pages).
Canfield, S. et al.; "The Binding Affinity of Human IgG for its High Affinity Fc Receptor Is Determined by Multiple Amino Acids in the $C_H2$ Domain and Is Modulated by the Hinge Region"; J. Exp. Med., vol. 173, pp. 1483-1491; Jun. 1991; 0022-1007/91/06/1483/09 (9 pages).
Tan, P. et al.; "'Superhumanized' Antibodies: Reduction of Immunogenic Potential by Complementarity-Determining Region Grafting with Human Germline Sequences: Application to an Anti-CD28"; J. Immuol. 2002, 169: 1119-1125 (8 pages).
Examination Report in related European Patent Application No. 20918015.7, dated Feb. 29, 2024 (11 pages).
Examination Report in related Chinese Patent Application No. 202010229581.1, in Chinese, dated Jun. 21, 2024 (5 pages).
Wu Danqing et al.; "Advances in Bispecific Antibody Technique and Its Clinical Applications"; Progress in Pharmaceutical Sciences, vol. 41, No. 9, pp. 653-661; Sep. 2017, in Chinese (9 pages).

* cited by examiner

SEQUENCE LISTING

```
<160> NUMBER OF SEQ ID NOS: 42

<210> SEQ ID NO 1
<211> LENGTH: 5
<212> TYPE: PRT
<213> ORGANISM: Artificial Sequence
<220> FEATURE:
<223> OTHER INFORMATION: Synthetic Polypeptide

<400> SEQUENCE: 1

Asn Ala Trp Met His
```

```
1               5

<210> SEQ ID NO 2
<211> LENGTH: 19
<212> TYPE: PRT
<213> ORGANISM: Artificial Sequence
<220> FEATURE:
<223> OTHER INFORMATION: Synthetic Polypeptide

<400> SEQUENCE: 2

Gln Ile Lys Asp Lys Ser Asn Asn Tyr Ala Thr Tyr Tyr Ala Asp Ala
1               5                   10                  15

Val Lys Gly

<210> SEQ ID NO 3
<211> LENGTH: 13
<212> TYPE: PRT
<213> ORGANISM: Artificial Sequence
<220> FEATURE:
<223> OTHER INFORMATION: Synthetic Polypeptide

<400> SEQUENCE: 3

Val His Tyr Gly Val Arg Phe Phe Tyr Thr Met Asp Val
1               5                   10

<210> SEQ ID NO 4
<211> LENGTH: 16
<212> TYPE: PRT
<213> ORGANISM: Artificial Sequence
<220> FEATURE:
<223> OTHER INFORMATION: Synthetic Polypeptide

<400> SEQUENCE: 4

Lys Ser Ser Gln Ser Leu Val His Ser Asn Asp Asn Thr Tyr Leu Thr
1               5                   10                  15

<210> SEQ ID NO 5
<211> LENGTH: 7
<212> TYPE: PRT
<213> ORGANISM: Artificial Sequence
<220> FEATURE:
<223> OTHER INFORMATION: Synthetic Polypeptide

<400> SEQUENCE: 5

Lys Val Ser Asn Arg Phe Ser
1               5

<210> SEQ ID NO 6
<211> LENGTH: 9
<212> TYPE: PRT
<213> ORGANISM: Artificial Sequence
<220> FEATURE:
<223> OTHER INFORMATION: Synthetic Polypeptide

<400> SEQUENCE: 6

Gly Gln Gly Thr Gln Tyr Pro Phe Thr
1               5

<210> SEQ ID NO 7
<211> LENGTH: 5
<212> TYPE: PRT
<213> ORGANISM: Artificial Sequence
<220> FEATURE:
<223> OTHER INFORMATION: Synthetic Polypeptide

<400> SEQUENCE: 7
```

```
Ser Tyr Asp Val Ser
1               5
```

<210> SEQ ID NO 8
<211> LENGTH: 17
<212> TYPE: PRT
<213> ORGANISM: Artificial Sequence
<220> FEATURE:
<223> OTHER INFORMATION: Synthetic Polypeptide

<400> SEQUENCE: 8

```
Trp Val Tyr Pro Val Asp Gly Ser Thr Lys Phe Asn Glu Lys Phe Lys
1               5                   10                  15

Gly
```

<210> SEQ ID NO 9
<211> LENGTH: 12
<212> TYPE: PRT
<213> ORGANISM: Artificial Sequence
<220> FEATURE:
<223> OTHER INFORMATION: Synthetic Polypeptide

<400> SEQUENCE: 9

```
Leu Thr Tyr Gly Asp Phe Gly Asp Ala Met Asp Tyr
1               5                   10
```

<210> SEQ ID NO 10
<211> LENGTH: 12
<212> TYPE: PRT
<213> ORGANISM: Artificial Sequence
<220> FEATURE:
<223> OTHER INFORMATION: Synthetic Polypeptide

<400> SEQUENCE: 10

```
Glu Arg Lys Ser Cys Val Glu Cys Pro Pro Cys Pro
1               5                   10
```

<210> SEQ ID NO 11
<211> LENGTH: 124
<212> TYPE: PRT
<213> ORGANISM: Artificial Sequence
<220> FEATURE:
<223> OTHER INFORMATION: Synthetic Polypeptide

<400> SEQUENCE: 11

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asn Ala
            20                  25                  30

Trp Met His Trp Val Arg Gln Ala Pro Gly Lys Gly Leu Glu Trp Val
        35                  40                  45

Gly Gln Ile Lys Asp Lys Ser Asn Asn Tyr Ala Thr Tyr Tyr Ala Asp
    50                  55                  60

Ala Val Lys Gly Arg Phe Thr Ile Ser Arg Asp Asp Ser Lys Asn Ser
65                  70                  75                  80

Leu Tyr Leu Gln Met Asn Ser Leu Lys Thr Glu Asp Thr Ala Val Tyr
                85                  90                  95

Tyr Cys Arg Tyr Val His Tyr Gly Val Arg Phe Phe Tyr Thr Met Asp
            100                 105                 110

Val Trp Gly Gln Gly Thr Thr Val Thr Val Ser Ser
        115                 120
```

-continued

<210> SEQ ID NO 12
<211> LENGTH: 112
<212> TYPE: PRT
<213> ORGANISM: Artificial Sequence
<220> FEATURE:
<223> OTHER INFORMATION: Synthetic Polypeptide

<400> SEQUENCE: 12

Asp Ile Val Met Thr Gln Thr Pro Leu Ser Leu Ser Val Thr Pro Gly
1               5                   10                  15

Gln Pro Ala Ser Ile Ser Cys Lys Ser Ser Gln Ser Leu Val His Ser
            20                  25                  30

Asn Asp Asn Thr Tyr Leu Thr Trp Tyr Leu Gln Lys Pro Gly Gln Ser
        35                  40                  45

Pro Gln Leu Leu Ile Tyr Lys Val Ser Asn Arg Phe Ser Gly Val Pro
    50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Gly Gln Gly
                85                  90                  95

Thr Gln Tyr Pro Phe Thr Phe Gly Gln Gly Thr Lys Leu Glu Ile Lys
            100                 105                 110

<210> SEQ ID NO 13
<211> LENGTH: 121
<212> TYPE: PRT
<213> ORGANISM: Artificial Sequence
<220> FEATURE:
<223> OTHER INFORMATION: Synthetic Polypeptide

<400> SEQUENCE: 13

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Ser Tyr
            20                  25                  30

Asp Val Ser Trp Val Arg Gln Ala Pro Gly Gln Arg Leu Glu Trp Met
        35                  40                  45

Gly Trp Val Tyr Pro Val Asp Gly Ser Thr Lys Phe Asn Glu Lys Phe
    50                  55                  60

Lys Gly Arg Val Thr Leu Thr Ala Asp Arg Ser Ser Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Leu Thr Tyr Gly Asp Phe Gly Asp Ala Met Asp Tyr Trp Gly
            100                 105                 110

Gln Gly Thr Leu Val Thr Val Ser Ser
        115                 120

<210> SEQ ID NO 14
<211> LENGTH: 105
<212> TYPE: PRT
<213> ORGANISM: Homo sapiens

<400> SEQUENCE: 14

Gln Asp Gly Asn Glu Glu Met Gly Gly Ile Thr Gln Thr Pro Tyr Lys
1               5                   10                  15

Val Ser Ile Ser Gly Thr Thr Val Ile Leu Thr Cys Pro Gln Tyr Pro
            20                  25                  30

Gly Ser Glu Ile Leu Trp Gln His Asn Asp Lys Asn Ile Gly Gly Asp

```
            35                  40                  45
Glu Asp Asp Lys Asn Ile Gly Ser Asp Glu Asp His Leu Ser Leu Lys
 50                  55                  60

Glu Phe Ser Glu Leu Glu Gln Ser Gly Tyr Tyr Val Cys Tyr Pro Arg
 65                  70                  75                  80

Gly Ser Lys Pro Glu Asp Ala Asn Phe Tyr Leu Tyr Leu Arg Ala Arg
                 85                  90                  95

Val Cys Glu Asn Cys Met Glu Met Asp
                100                 105

<210> SEQ ID NO 15
<211> LENGTH: 84
<212> TYPE: PRT
<213> ORGANISM: Homo sapiens

<400> SEQUENCE: 15

Phe Lys Ile Pro Ile Glu Glu Leu Glu Asp Arg Val Phe Val Asn Cys
 1               5                  10                  15

Asn Thr Ser Ile Thr Trp Val Glu Gly Thr Val Gly Thr Leu Leu Ser
                 20                  25                  30

Asp Ile Thr Arg Leu Asp Leu Gly Lys Arg Ile Leu Asp Pro Arg Gly
                 35                  40                  45

Ile Tyr Arg Cys Asn Gly Thr Asp Ile Tyr Lys Asp Lys Glu Ser Thr
 50                  55                  60

Val Gln Val His Tyr Arg Met Cys Gln Ser Cys Val Glu Leu Asp Pro
 65                  70                  75                  80

Ala Thr Val Ala

<210> SEQ ID NO 16
<211> LENGTH: 96
<212> TYPE: PRT
<213> ORGANISM: Macaca fascicularis

<400> SEQUENCE: 16

Gln Asp Gly Asn Glu Glu Met Gly Ser Ile Thr Gln Thr Pro Tyr Gln
 1               5                  10                  15

Val Ser Ile Ser Gly Thr Thr Val Ile Leu Thr Cys Ser Gln His Leu
                 20                  25                  30

Gly Ser Glu Ala Gln Trp Gln His Asn Gly Lys Asn Lys Glu Asp Ser
                 35                  40                  45

Gly Asp Arg Leu Phe Leu Pro Glu Phe Ser Glu Met Glu Gln Ser Gly
                 50                  55                  60

Tyr Tyr Val Cys Tyr Pro Arg Gly Ser Asn Pro Glu Asp Ala Ser His
 65                  70                  75                  80

His Leu Tyr Leu Lys Ala Arg Val Cys Glu Asn Cys Met Glu Met Asp
                 85                  90                  95

<210> SEQ ID NO 17
<211> LENGTH: 84
<212> TYPE: PRT
<213> ORGANISM: Macaca fascicularis

<400> SEQUENCE: 17

Phe Lys Ile Pro Val Glu Glu Leu Glu Asp Arg Val Phe Val Lys Cys
 1               5                  10                  15

Asn Thr Ser Val Thr Trp Val Gly Thr Val Gly Thr Leu Leu Thr
                 20                  25                  30
```

```
Asn Asn Thr Arg Leu Asp Leu Gly Lys Arg Ile Leu Asp Pro Arg Gly
             35                  40                  45

Ile Tyr Arg Cys Asn Gly Thr Asp Ile Tyr Lys Asp Lys Glu Ser Ala
 50                  55                  60

Val Gln Val His Tyr Arg Met Cys Gln Asn Cys Val Glu Leu Asp Pro
 65                  70                  75                  80

Ala Thr Leu Ala

<210> SEQ ID NO 18
<211> LENGTH: 87
<212> TYPE: PRT
<213> ORGANISM: Mus musculus

<400> SEQUENCE: 18

Asp Asp Ala Glu Asn Ile Glu Tyr Lys Val Ser Ile Ser Gly Thr Ser
 1               5                   10                  15

Val Glu Leu Thr Cys Pro Leu Asp Ser Asp Glu Asn Leu Lys Trp Glu
             20                  25                  30

Lys Asn Gly Gln Glu Leu Pro Gln Lys His Asp Lys His Leu Val Leu
             35                  40                  45

Gln Asp Phe Ser Glu Val Glu Asp Ser Gly Tyr Tyr Val Cys Tyr Thr
 50                  55                  60

Pro Ala Ser Asn Lys Asn Thr Tyr Leu Tyr Leu Lys Ala Arg Val Cys
 65                  70                  75                  80

Glu Tyr Cys Val Glu Val Asp
                 85

<210> SEQ ID NO 19
<211> LENGTH: 84
<212> TYPE: PRT
<213> ORGANISM: Mus musculus

<400> SEQUENCE: 19

Phe Lys Ile Gln Val Thr Glu Tyr Glu Asp Lys Val Phe Val Thr Cys
 1               5                   10                  15

Asn Thr Ser Val Met His Leu Asp Gly Thr Val Glu Gly Trp Phe Ala
             20                  25                  30

Lys Asn Lys Thr Leu Asn Leu Gly Lys Gly Val Leu Asp Pro Arg Gly
             35                  40                  45

Ile Tyr Leu Cys Asn Gly Thr Glu Gln Leu Ala Lys Val Val Ser Ser
 50                  55                  60

Val Gln Val His Tyr Arg Met Cys Gln Asn Cys Val Glu Leu Asp Ser
 65                  70                  75                  80

Gly Thr Met Ala

<210> SEQ ID NO 20
<211> LENGTH: 287
<212> TYPE: PRT
<213> ORGANISM: Homo sapiens

<400> SEQUENCE: 20

Thr Lys Glu Asp Pro Asn Pro Pro Ile Thr Asn Leu Arg Met Lys Ala
 1               5                   10                  15

Lys Ala Gln Gln Leu Thr Trp Asp Leu Asn Arg Asn Val Thr Asp Ile
             20                  25                  30

Glu Cys Val Lys Asp Ala Asp Tyr Ser Met Pro Ala Val Asn Asn Ser
             35                  40                  45
```

```
Tyr Cys Gln Phe Gly Ala Ile Ser Leu Cys Glu Val Thr Asn Tyr Thr
     50                   55                   60

Val Arg Val Ala Asn Pro Pro Phe Ser Thr Trp Ile Leu Phe Pro Glu
 65                  70                  75                  80

Asn Ser Gly Lys Pro Trp Ala Gly Ala Glu Asn Leu Thr Cys Trp Ile
                 85                  90                  95

His Asp Val Asp Phe Leu Ser Cys Ser Trp Ala Val Gly Pro Gly Ala
            100                 105                 110

Pro Ala Asp Val Gln Tyr Asp Leu Tyr Leu Asn Val Ala Asn Arg Arg
            115                 120                 125

Gln Gln Tyr Glu Cys Leu His Tyr Lys Thr Asp Ala Gln Gly Thr Arg
130                 135                 140

Ile Gly Cys Arg Phe Asp Asp Ile Ser Arg Leu Ser Ser Gly Ser Gln
145                 150                 155                 160

Ser Ser His Ile Leu Val Arg Gly Arg Ser Ala Ala Phe Gly Ile Pro
                165                 170                 175

Cys Thr Asp Lys Phe Val Val Phe Ser Gln Ile Glu Ile Leu Thr Pro
            180                 185                 190

Pro Asn Met Thr Ala Lys Cys Asn Lys Thr His Ser Phe Met His Trp
    195                 200                 205

Lys Met Arg Ser His Phe Asn Arg Lys Phe Arg Tyr Glu Leu Gln Ile
210                 215                 220

Gln Lys Arg Met Gln Pro Val Ile Thr Glu Gln Val Arg Asp Arg Thr
225                 230                 235                 240

Ser Phe Gln Leu Leu Asn Pro Gly Thr Tyr Thr Val Gln Ile Arg Ala
                245                 250                 255

Arg Glu Arg Val Tyr Glu Phe Leu Ser Ala Trp Ser Thr Pro Gln Arg
            260                 265                 270

Phe Glu Cys Asp Gln Glu Glu Gly Ala Asn Thr Arg Ala Trp Arg
            275                 280                 285

<210> SEQ ID NO 21
<211> LENGTH: 288
<212> TYPE: PRT
<213> ORGANISM: Macaca fascicularis

<400> SEQUENCE: 21

Arg Thr Lys Glu Asp Pro Asn Ala Pro Ile Arg Asn Leu Arg Met Lys
 1               5                  10                  15

Glu Lys Ala Gln Gln Leu Met Trp Asp Leu Asn Arg Asn Val Thr Asp
            20                  25                  30

Val Glu Cys Ile Lys Gly Thr Asp Tyr Ser Met Pro Ala Met Asn Asn
         35                  40                  45

Ser Tyr Cys Gln Phe Gly Ala Ile Ser Leu Cys Glu Val Thr Asn Tyr
     50                  55                  60

Thr Val Arg Val Ala Ser Pro Pro Phe Ser Thr Trp Ile Leu Phe Pro
 65                  70                  75                  80

Glu Asn Ser Gly Thr Pro Arg Ala Gly Ala Glu Asn Leu Thr Cys Trp
                 85                  90                  95

Val His Asp Val Asp Phe Leu Ser Cys Ser Trp Val Val Gly Pro Ala
             100                 105                 110

Ala Pro Ala Asp Val Gln Tyr Asp Leu Tyr Leu Asn Asn Pro Asn Ser
             115                 120                 125

His Glu Gln Tyr Arg Cys Leu His Tyr Lys Thr Asp Ala Arg Gly Thr
130                  135                 140
```

```
Gln Ile Gly Cys Arg Phe Asp Asp Ile Ala Pro Leu Ser Arg Gly Ser
145                 150                 155                 160

Gln Ser Ser His Ile Leu Val Arg Gly Arg Ser Ala Ala Val Ser Ile
            165                 170                 175

Pro Cys Thr Asp Lys Phe Val Phe Phe Ser Gln Ile Glu Arg Leu Thr
            180                 185                 190

Pro Pro Asn Met Thr Gly Glu Cys Asn Glu Thr His Ser Phe Met His
            195                 200                 205

Trp Lys Met Lys Ser His Phe Asn Arg Lys Phe Arg Tyr Glu Leu Arg
210                 215                 220

Ile Gln Lys Arg Met Gln Pro Val Arg Thr Glu Gln Val Arg Asp Thr
225                 230                 235                 240

Thr Ser Phe Gln Leu Pro Asn Pro Gly Thr Tyr Thr Val Gln Ile Arg
            245                 250                 255

Ala Arg Glu Thr Val Tyr Glu Phe Leu Ser Ala Trp Ser Thr Pro Gln
            260                 265                 270

Arg Phe Glu Cys Asp Gln Glu Gly Ala Ser Ser Arg Ala Trp Arg
            275                 280                 285

<210> SEQ ID NO 22
<211> LENGTH: 315
<212> TYPE: PRT
<213> ORGANISM: Mus musculus

<400> SEQUENCE: 22

Ser Asp Leu Ala Ala Val Arg Glu Ala Pro Thr Ala Val Thr Thr
1               5                   10                  15

Pro Ile Gln Asn Leu His Ile Asp Pro Ala His Tyr Thr Leu Ser Trp
            20                  25                  30

Asp Pro Ala Pro Gly Ala Asp Ile Thr Thr Gly Ala Phe Cys Arg Lys
            35                  40                  45

Gly Arg Asp Ile Phe Val Trp Ala Asp Pro Gly Leu Ala Arg Cys Ser
50                  55                  60

Phe Gln Ser Leu Ser Leu Cys His Val Thr Asn Phe Thr Val Phe Leu
65                  70                  75                  80

Gly Lys Asp Arg Ala Val Ala Gly Ser Ile Gln Phe Pro Pro Asp Asp
            85                  90                  95

Asp Gly Asp His Glu Ala Ala Ala Gln Asp Leu Arg Cys Trp Val His
            100                 105                 110

Glu Gly Gln Leu Ser Cys Gln Trp Glu Arg Gly Pro Lys Ala Thr Gly
            115                 120                 125

Asp Val His Tyr Arg Met Phe Trp Arg Asp Val Arg Leu Gly Pro Ala
            130                 135                 140

His Asn Arg Glu Cys Pro His Tyr His Ser Leu Asp Val Asn Thr Ala
145                 150                 155                 160

Gly Pro Ala Pro His Gly Gly His Glu Gly Cys Thr Leu Asp Leu Asp
            165                 170                 175

Thr Val Leu Gly Ser Thr Pro Asn Ser Pro Asp Leu Val Pro Gln Val
            180                 185                 190

Thr Ile Thr Val Asn Gly Ser Gly Arg Ala Gly Pro Val Pro Cys Met
            195                 200                 205

Asp Asn Thr Val Asp Leu Gln Arg Ala Glu Val Leu Ala Pro Pro Thr
            210                 215                 220

Leu Thr Val Glu Cys Asn Gly Ser Glu Ala His Ala Arg Trp Val Ala
```

```
                225                 230                 235                 240
Arg Asn Arg Phe His His Gly Leu Leu Gly Tyr Thr Leu Gln Val Asn
                    245                 250                 255

Gln Ser Ser Arg Ser Glu Pro Gln Glu Tyr Asn Val Ser Ile Pro His
                260                 265                 270

Phe Trp Val Pro Asn Ala Gly Ala Ile Ser Phe Arg Val Lys Ser Arg
                275                 280                 285

Ser Glu Val Tyr Pro Arg Lys Leu Ser Ser Trp Ser Glu Ala Trp Gly
            290                 295                 300

Leu Val Cys Pro Pro Glu Val Met Pro Val Lys
305                 310                 315

<210> SEQ ID NO 23
<211> LENGTH: 6
<212> TYPE: PRT
<213> ORGANISM: Artificial Sequence
<220> FEATURE:
<223> OTHER INFORMATION: Synthetic Polypeptide

<400> SEQUENCE: 23

His His His His His His
1               5

<210> SEQ ID NO 24
<211> LENGTH: 232
<212> TYPE: PRT
<213> ORGANISM: Mus musculus

<400> SEQUENCE: 24

Pro Arg Gly Pro Thr Ile Lys Pro Cys Pro Pro Cys Lys Cys Pro Ala
1               5                   10                  15

Pro Asn Leu Leu Gly Gly Pro Ser Val Phe Ile Phe Pro Pro Lys Ile
                20                  25                  30

Lys Asp Val Leu Met Ile Ser Leu Ser Pro Ile Val Thr Cys Val Val
            35                  40                  45

Val Asp Val Ser Glu Asp Asp Pro Asp Val Gln Ile Ser Trp Phe Val
    50                  55                  60

Asn Asn Val Glu Val His Thr Ala Gln Thr Gln Thr His Arg Glu Asp
65                  70                  75                  80

Tyr Asn Ser Thr Leu Arg Val Val Ser Ala Leu Pro Ile Gln His Gln
                85                  90                  95

Asp Trp Met Ser Gly Lys Glu Phe Lys Cys Lys Val Asn Asn Lys Asp
            100                 105                 110

Leu Pro Ala Pro Ile Glu Arg Thr Ile Ser Lys Pro Lys Gly Ser Val
        115                 120                 125

Arg Ala Pro Gln Val Tyr Val Leu Pro Pro Glu Glu Glu Met Thr
    130                 135                 140

Lys Lys Gln Val Thr Leu Thr Cys Met Val Thr Asp Phe Met Pro Glu
145                 150                 155                 160

Asp Ile Tyr Val Glu Trp Thr Asn Asn Gly Lys Thr Glu Leu Asn Tyr
                165                 170                 175

Lys Asn Thr Glu Pro Val Leu Asp Ser Asp Gly Ser Tyr Phe Met Tyr
            180                 185                 190

Ser Lys Leu Arg Val Glu Lys Lys Asn Trp Val Glu Arg Asn Ser Tyr
        195                 200                 205

Ser Cys Ser Val Val His Glu Gly Leu His Asn His Thr Thr Lys
    210                 215                 220
```

Ser Phe Ser Arg Thr Pro Gly Lys
225                 230

<210> SEQ ID NO 25
<211> LENGTH: 232
<212> TYPE: PRT
<213> ORGANISM: Artificial Sequence
<220> FEATURE:
<223> OTHER INFORMATION: Synthetic Polypeptide

<400> SEQUENCE: 25

Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
            35                  40                  45

Val Asp Val Ser His Glu Asp Pro Glu Val Lys Phe Asn Trp Tyr Val
        50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Pro Ile Glu Lys Thr Ile Ser Lys Ala Lys Gly Gln Pro
        115                 120                 125

Arg Glu Pro Gln Val Tyr Thr Leu Pro Pro Cys Arg Glu Glu Met Thr
130                 135                 140

Lys Asn Gln Val Ser Leu Trp Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
        195                 200                 205

Ser Cys Ser Val Met His Glu Ala Leu His Asn His Tyr Thr Gln Lys
    210                 215                 220

Ser Leu Ser Leu Ser Pro Gly Lys
225                 230

<210> SEQ ID NO 26
<211> LENGTH: 232
<212> TYPE: PRT
<213> ORGANISM: Artificial Sequence
<220> FEATURE:
<223> OTHER INFORMATION: Synthetic Polypeptide

<400> SEQUENCE: 26

Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
            35                  40                  45

Val Asp Val Ser His Glu Asp Pro Glu Val Lys Phe Asn Trp Tyr Val

```
            50                  55                  60
Asp Gly Val Glu Val His Asn Ala Lys Thr Lys Pro Arg Glu Gln
65                  70                  75                  80

Tyr Asn Ser Thr Tyr Arg Val Val Ser Val Leu Thr Val Leu His Gln
                    85                  90                  95

Asp Trp Leu Asn Gly Lys Glu Tyr Lys Cys Lys Val Ser Asn Lys Ala
                100                 105                 110

Leu Pro Ala Pro Ile Glu Lys Thr Ile Ser Lys Ala Lys Gly Gln Pro
            115                 120                 125

Arg Glu Pro Gln Val Cys Thr Leu Pro Pro Ser Arg Glu Glu Met Thr
130                 135                 140

Lys Asn Gln Val Ser Leu Ser Cys Ala Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Val
                180                 185                 190

Ser Lys Leu Thr Val Asp Lys Ser Arg Trp Gln Gln Gly Asn Val Phe
            195                 200                 205

Ser Cys Ser Val Met His Glu Ala Leu His Asn His Tyr Thr Gln Lys
210                 215                 220

Ser Leu Ser Leu Ser Pro Gly Lys
225                 230

<210> SEQ ID NO 27
<211> LENGTH: 330
<212> TYPE: PRT
<213> ORGANISM: Homo sapiens

<400> SEQUENCE: 27

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
                20                  25                  30

Phe Pro Glu Pro Val Thr Val Ser Trp Asn Ser Gly Ala Leu Thr Ser
            35                  40                  45

Gly Val His Thr Phe Pro Ala Val Leu Gln Ser Ser Gly Leu Tyr Ser
        50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190
```

His Gln Asp Trp Leu Asn Gly Lys Glu Tyr Lys Cys Lys Val Ser Asn
            195                 200                 205

Lys Ala Leu Pro Ala Pro Ile Glu Lys Thr Ile Ser Lys Ala Lys Gly
        210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 28
<211> LENGTH: 330
<212> TYPE: PRT
<213> ORGANISM: Artificial Sequence
<220> FEATURE:
<223> OTHER INFORMATION: Synthetic Polypeptide

<400> SEQUENCE: 28

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

```
Gln Pro Arg Glu Pro Gln Val Cys Thr Leu Pro Ser Arg Glu Glu
225                 230                 235                 240

Met Thr Lys Asn Gln Val Ser Leu Ser Cys Ala Val Lys Gly Phe Tyr
            245                 250                 255

Pro Ser Asp Ile Ala Val Glu Trp Glu Ser Asn Gly Gln Pro Glu Asn
        260                 265                 270

Asn Tyr Lys Thr Thr Pro Pro Val Leu Asp Ser Asp Gly Ser Phe Phe
    275                 280                 285

Leu Val Ser Lys Leu Thr Val Asp Lys Ser Arg Trp Gln Gln Gly Asn
290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 29
<211> LENGTH: 330
<212> TYPE: PRT
<213> ORGANISM: Artificial Sequence
<220> FEATURE:
<223> OTHER INFORMATION: Synthetic Polypeptide

<400> SEQUENCE: 29

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Cys Arg Glu Glu
225                 230                 235                 240

Met Thr Lys Asn Gln Val Ser Leu Trp Cys Leu Val Lys Gly Phe Tyr
                245                 250                 255
```

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
        290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
            325                 330

<210> SEQ ID NO 30
<211> LENGTH: 330
<212> TYPE: PRT
<213> ORGANISM: Artificial Sequence
<220> FEATURE:
<223> OTHER INFORMATION: Synthetic Polypeptide

<400> SEQUENCE: 30

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Phe Glu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
    210                 215                 220

Gln Pro Arg Glu Pro Gln Val Cys Thr Leu Pro Pro Ser Arg Glu Glu
225                 230                 235                 240

Met Thr Lys Asn Gln Val Ser Leu Ser Cys Ala Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

```
Leu Val Ser Lys Leu Thr Val Asp Lys Ser Arg Trp Gln Gln Gly Asn
            290                 295                 300

Val Phe Ser Cys Ser Val Met His Glu Ala Leu His Asn His Tyr Thr
305                 310                 315                 320

Gln Lys Ser Leu Ser Leu Ser Pro Gly Lys
                325                 330

<210> SEQ ID NO 31
<211> LENGTH: 330
<212> TYPE: PRT
<213> ORGANISM: Artificial Sequence
<220> FEATURE:
<223> OTHER INFORMATION: Synthetic Polypeptide

<400> SEQUENCE: 31

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Phe Glu Gly Gly Pro Ser Val Phe Leu Phe Pro Pro
        115                 120                 125

Lys Pro Lys Asp Thr Leu Met Ile Ser Arg Thr Pro Glu Val Thr Cys
130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Ser Ile Glu Lys Thr Ile Ser Lys Ala Lys Gly
    210                 215                 220

Gln Pro Arg Glu Pro Gln Val Tyr Thr Leu Pro Pro Cys Arg Glu Glu
225                 230                 235                 240

Met Thr Lys Asn Gln Val Ser Leu Trp Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320
```

```
Gln Lys Ser Leu Ser Leu Ser Pro Gly Lys
            325                 330
```

<210> SEQ ID NO 32
<211> LENGTH: 107
<212> TYPE: PRT
<213> ORGANISM: Homo sapiens

<400> SEQUENCE: 32

```
Arg Thr Val Ala Ala Pro Ser Val Phe Ile Phe Pro Pro Ser Asp Glu
1               5                   10                  15

Gln Leu Lys Ser Gly Thr Ala Ser Val Val Cys Leu Leu Asn Asn Phe
            20                  25                  30

Tyr Pro Arg Glu Ala Lys Val Gln Trp Lys Val Asp Asn Ala Leu Gln
        35                  40                  45

Ser Gly Asn Ser Gln Glu Ser Val Thr Glu Gln Asp Ser Lys Asp Ser
    50                  55                  60

Thr Tyr Ser Leu Ser Ser Thr Leu Thr Leu Ser Lys Ala Asp Tyr Glu
65                  70                  75                  80

Lys His Lys Val Tyr Ala Cys Glu Val Thr His Gln Gly Leu Ser Ser
                85                  90                  95

Pro Val Thr Lys Ser Phe Asn Arg Gly Glu Cys
            100                 105
```

<210> SEQ ID NO 33
<211> LENGTH: 106
<212> TYPE: PRT
<213> ORGANISM: Homo sapiens

<400> SEQUENCE: 33

```
Gly Gln Pro Lys Ala Ala Pro Ser Val Thr Leu Phe Pro Pro Ser Ser
1               5                   10                  15

Glu Glu Leu Gln Ala Asn Lys Ala Thr Leu Val Cys Leu Ile Ser Asp
            20                  25                  30

Phe Tyr Pro Gly Ala Val Thr Val Ala Trp Lys Ala Asp Ser Ser Pro
        35                  40                  45

Val Lys Ala Gly Val Glu Thr Thr Thr Pro Ser Lys Gln Ser Asn Asn
    50                  55                  60

Lys Tyr Ala Ala Ser Ser Tyr Leu Ser Leu Thr Pro Glu Gln Trp Lys
65                  70                  75                  80

Ser His Arg Ser Tyr Ser Cys Gln Val Thr His Glu Gly Ser Thr Val
                85                  90                  95

Glu Lys Thr Val Ala Pro Thr Glu Cys Ser
            100                 105
```

<210> SEQ ID NO 34
<211> LENGTH: 124
<212> TYPE: PRT
<213> ORGANISM: Artificial Sequence
<220> FEATURE:
<223> OTHER INFORMATION: Synthetic Polypeptide

<400> SEQUENCE: 34

```
Glu Val Gln Leu Val Glu Thr Gly Glu Asn Leu Val Gln Pro Gly Lys
1               5                   10                  15

Ser Leu Arg Leu Thr Cys Ala Thr Ser Gly Phe Ser Phe Ser Asn Ala
            20                  25                  30

Trp Met His Trp Ile Arg Gln Ser Pro Glu Lys Gln Leu Glu Trp Val
        35                  40                  45
```

```
Ala Gln Ile Lys Asp Lys Ser Asn Asn Tyr Ala Thr Tyr Tyr Ala Glu
        50                  55                  60

Ser Val Asn Gly Arg Phe Thr Ile Ser Arg Asp Asp Ser Lys Ser Ser
65                  70                  75                  80

Ile Tyr Leu His Met Asp Asn Leu Lys Glu Glu Asp Ser Ala Ile Tyr
                85                  90                  95

Tyr Cys Arg Tyr Val His Tyr Gly Val Arg Phe Phe Tyr Thr Met Asp
                100                 105                 110

Val Trp Gly Gln Gly Thr Ser Val Thr Val Ser Ser
            115                 120
```

<210> SEQ ID NO 35
<211> LENGTH: 112
<212> TYPE: PRT
<213> ORGANISM: Artificial Sequence
<220> FEATURE:
<223> OTHER INFORMATION: Synthetic Polypeptide

<400> SEQUENCE: 35

```
Asp Val Val Met Thr Gln Thr Pro Val Ser Leu Ser Val Ser Leu Gly
1               5                   10                  15

Asp Gln Val Ser Ile Ser Cys Arg Pro Ser Gln Ser Leu Val His Asn
                20                  25                  30

Asn Gly Asn Thr Tyr Leu Ser Trp Tyr Leu Gln Lys Pro Gly Gln Ser
            35                  40                  45

Pro His Pro Leu Ile Tyr Lys Val Ser Asn Arg Phe Ser Gly Ile Ser
        50                  55                  60

Asp Arg Phe Ser Gly Ser Gly Ser Gly Thr Asp Phe Thr Leu Lys Ile
65                  70                  75                  80

Ser Arg Val Glu Pro Asp Asp Leu Gly Val Tyr Tyr Cys Gly Gln Gly
                85                  90                  95

Thr Gln Tyr Pro Phe Thr Phe Gly Ser Gly Thr Lys Leu Glu Ile Lys
                100                 105                 110
```

<210> SEQ ID NO 36
<211> LENGTH: 248
<212> TYPE: PRT
<213> ORGANISM: Artificial Sequence
<220> FEATURE:
<223> OTHER INFORMATION: Synthetic Polypeptide

<400> SEQUENCE: 36

```
Gln Val Gln Leu Gln Gln Ser Gly Ala Glu Leu Ala Lys Pro Gly Ala
1               5                   10                  15

Ser Val Lys Ile Ser Cys Lys Ala Ser Gly Tyr Thr Phe Thr Ser Tyr
                20                  25                  30

Asp Val Ser Trp Val Lys Gln Arg Pro Gly Gln Gly Leu Glu Trp Ile
            35                  40                  45

Gly Trp Val Tyr Pro Val Asp Gly Ser Thr Lys Phe Asn Glu Lys Phe
        50                  55                  60

Lys Gly Lys Ala Thr Leu Thr Ala Asp Arg Ser Ser Ser Thr Ala Tyr
65                  70                  75                  80

Met Gln Leu Thr Ser Leu Thr Ser Glu Asp Ser Ala Val Tyr Phe Cys
                85                  90                  95

Ala Arg Leu Arg Tyr Gly Asn Tyr Gly Asp Ala Met Asp Asp Trp Gly
                100                 105                 110

Gln Gly Thr Ser Val Thr Val Ser Ala Gly Gly Gly Gly Ser Gly Gly
```

```
            115                 120                 125
Gly Gly Ser Gly Gly Gly Ser Asp Val Val Met Thr Gln Thr Pro
    130                 135                 140

Val Ser Leu Ser Val Ser Leu Gly Asp Gln Val Ser Ile Ser Cys Arg
145                 150                 155                 160

Pro Ser Gln Ser Leu Val His Asn Asn Gly Asn Thr Tyr Leu Ser Trp
                165                 170                 175

Tyr Leu Gln Lys Pro Gly Gln Ser Pro His Pro Leu Ile Tyr Lys Val
            180                 185                 190

Ser Asn Arg Phe Ser Gly Ile Ser Asp Arg Phe Ser Gly Ser Gly Ser
        195                 200                 205

Gly Thr Asp Phe Thr Leu Lys Ile Ser Arg Val Glu Pro Asp Asp Leu
    210                 215                 220

Gly Val Tyr Tyr Cys Gly Gln Gly Thr Gln Tyr Pro Phe Thr Phe Gly
225                 230                 235                 240

Ser Gly Thr Lys Leu Glu Ile Lys
                245

<210> SEQ ID NO 37
<211> LENGTH: 121
<212> TYPE: PRT
<213> ORGANISM: Artificial Sequence
<220> FEATURE:
<223> OTHER INFORMATION: Synthetic Polypeptide

<400> SEQUENCE: 37

Gln Val Gln Leu Gln Gln Ser Gly Ala Glu Leu Ala Lys Pro Gly Ala
1               5                   10                  15

Ser Val Lys Ile Ser Cys Lys Ala Ser Gly Tyr Thr Phe Thr Ser Tyr
            20                  25                  30

Asp Val Ser Trp Val Lys Gln Arg Pro Gly Gln Gly Leu Glu Trp Ile
        35                  40                  45

Gly Trp Val Tyr Pro Val Asp Gly Ser Thr Lys Phe Asn Glu Lys Phe
    50                  55                  60

Lys Gly Lys Ala Thr Leu Thr Ala Asp Arg Ser Ser Ser Thr Ala Tyr
65                  70                  75                  80

Met Gln Leu Thr Ser Leu Thr Ser Glu Asp Ser Ala Val Tyr Phe Cys
                85                  90                  95

Ala Arg Leu Arg Tyr Gly Asn Tyr Gly Asp Ala Met Asp Asp Trp Gly
            100                 105                 110

Gln Gly Thr Ser Val Thr Val Ser Ala
        115                 120

<210> SEQ ID NO 38
<211> LENGTH: 450
<212> TYPE: PRT
<213> ORGANISM: Artificial Sequence
<220> FEATURE:
<223> OTHER INFORMATION: Synthetic Polypeptide

<400> SEQUENCE: 38

Glu Val Gln Leu Val Gln Ser Gly Ala Glu Val Lys Lys Pro Gly Glu
1               5                   10                  15

Ser Leu Lys Ile Ser Cys Lys Gly Ser Gly Tyr Ser Phe Thr Asp Tyr
            20                  25                  30

Tyr Met Lys Trp Ala Arg Gln Met Pro Gly Lys Gly Leu Glu Trp Met
        35                  40                  45
```

```
Gly Asp Ile Ile Pro Ser Asn Gly Ala Thr Phe Tyr Asn Gln Lys Phe
 50                  55                  60

Lys Gly Gln Val Thr Ile Ser Ala Asp Lys Ser Ile Ser Thr Thr Tyr
 65                  70                  75                  80

Leu Gln Trp Ser Ser Leu Lys Ala Ser Asp Thr Ala Met Tyr Tyr Cys
                 85                  90                  95

Ala Arg Ser His Leu Leu Arg Ala Ser Trp Phe Ala Tyr Trp Gly Gln
             100                 105                 110

Gly Thr Met Val Thr Val Ser Ser Ala Ser Thr Lys Gly Pro Ser Val
             115                 120                 125

Phe Pro Leu Ala Pro Ser Ser Lys Ser Thr Ser Gly Gly Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
            195                 200                 205

Pro Ser Asn Thr Lys Val Asp Lys Lys Val Glu Pro Lys Ser Cys Asp
210                 215                 220

Lys Thr His Thr Cys Pro Pro Cys Pro Ala Pro Glu Leu Leu Gly Gly
225                 230                 235                 240

Pro Asp Val Phe Leu Phe Pro Pro Lys Pro Lys Asp Thr Leu Met Ile
                245                 250                 255

Ser Arg Thr Pro Glu Val Thr Cys Val Val Val Asp Val Ser His Glu
            260                 265                 270

Asp Pro Glu Val Gln Phe Asn Trp Tyr Val Asp Gly Val Glu Val His
            275                 280                 285

Asn Ala Lys Thr Lys Pro Arg Glu Glu Gln Phe Asn Ser Thr Phe Arg
290                 295                 300

Val Val Ser Val Leu Thr Val Val His Gln Asp Trp Leu Asn Gly Lys
305                 310                 315                 320

Glu Tyr Lys Cys Lys Val Ser Asn Lys Ala Leu Pro Ala Pro Glu Glu
                325                 330                 335

Lys Thr Ile Ser Lys Thr Lys Gly Gln Pro Arg Glu Pro Gln Val Tyr
            340                 345                 350

Thr Leu Pro Pro Ser Arg Glu Glu Met Thr Lys Asn Gln Val Ser Leu
            355                 360                 365

Thr Cys Leu Val Lys Gly Phe Tyr Pro Ser Asp Ile Ala Val Glu Trp
370                 375                 380

Glu Ser Asn Gly Gln Pro Glu Asn Asn Tyr Lys Thr Thr Pro Pro Met
385                 390                 395                 400

Leu Asp Ser Asp Gly Ser Phe Phe Leu Tyr Ser Lys Leu Thr Val Asp
                405                 410                 415

Lys Ser Arg Trp Gln Gln Gly Asn Val Phe Ser Cys Ser Val Met His
            420                 425                 430

Glu Ala Leu His Asn His Tyr Thr Gln Lys Ser Leu Ser Leu Ser Pro
            435                 440                 445

Gly Lys
450
```

<210> SEQ ID NO 39
<211> LENGTH: 220
<212> TYPE: PRT
<213> ORGANISM: Artificial Sequence
<220> FEATURE:
<223> OTHER INFORMATION: Synthetic Polypeptide

<400> SEQUENCE: 39

Asp Ile Val Met Thr Gln Ser Pro Asp Ser Leu Ala Val Ser Leu Gly
1               5                   10                  15

Glu Arg Ala Thr Ile Asn Cys Glu Ser Ser Gln Ser Leu Leu Asn Ser
            20                  25                  30

Gly Asn Gln Lys Asn Tyr Leu Thr Trp Tyr Gln Gln Lys Pro Gly Gln
        35                  40                  45

Pro Pro Lys Pro Leu Ile Tyr Trp Ala Ser Thr Arg Glu Ser Gly Val
    50                  55                  60

Pro Asp Arg Phe Ser Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Asn
                85                  90                  95

Asp Tyr Ser Tyr Pro Tyr Thr Phe Gly Gln Gly Thr Lys Leu Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 40
<211> LENGTH: 449
<212> TYPE: PRT
<213> ORGANISM: Artificial Sequence
<220> FEATURE:
<223> OTHER INFORMATION: Synthetic Polypeptide

<400> SEQUENCE: 40

Gln Val Gln Leu Gln Gln Ser Gly Ala Glu Val Lys Lys Pro Gly Ala
1               5                   10                  15

Ser Val Lys Val Ser Cys Lys Ala Ser Gly Tyr Thr Phe Thr Asp Tyr
            20                  25                  30

Tyr Met Lys Trp Val Lys Gln Ser His Gly Lys Ser Leu Glu Trp Met
        35                  40                  45

Gly Asp Ile Ile Pro Ser Asn Gly Ala Thr Phe Tyr Asn Gln Lys Phe
    50                  55                  60

Lys Gly Lys Ala Thr Leu Thr Val Asp Arg Ser Ser Thr Ser Ala Tyr
65                  70                  75                  80

Met Glu Leu Ser Ser Leu Arg Ser Glu Asp Thr Ala Val Tyr Tyr Cys
                85                  90                  95

```
Ala Arg Ser His Leu Leu Arg Ala Ser Trp Phe Ala Tyr Trp Gly Gln
            100                 105                 110

Gly Thr Leu Val Thr Val Ser Ser Ala Ser Thr Lys Gly Pro Ser Val
        115                 120                 125

Phe Pro Leu Ala Pro Ser Ser Lys Ser Thr Ser Gly Gly Thr Ala Ala
    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asp Thr Lys Val Asp Lys Lys Val Glu Pro Lys Ser Cys Asp
    210                 215                 220

Lys Thr His Thr Cys Pro Pro Cys Pro Ala Pro Pro Val Ala Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Lys His Glu Asp
            260                 265                 270

Pro Glu Val Lys Phe Asn Trp Tyr Val Asp Gly Val Glu Val His Asn
        275                 280                 285

Ala Lys Thr Lys Pro Arg Glu Glu Gln Tyr Asn Ser Thr Tyr Arg Val
    290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
            340                 345                 350

Leu Pro Pro Ser Arg Glu Glu Met Thr Lys Asn Gln Val Ser Leu Thr
        355                 360                 365

Cys Asp Val Ser Gly Phe Tyr Pro Ser Asp Ile Ala Val Glu Trp Glu
    370                 375                 380

Ser Asp Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Glu Gln Gly Asp Val Phe Ser Cys Ser Val Met His Glu
            420                 425                 430

Ala Leu His Asn His Tyr Thr Gln Lys Ser Leu Ser Leu Ser Pro Gly
        435                 440                 445

Lys
```

<210> SEQ ID NO 41
<211> LENGTH: 485
<212> TYPE: PRT
<213> ORGANISM: Artificial Sequence
<220> FEATURE:
<223> OTHER INFORMATION: Synthetic Polypeptide
<400> SEQUENCE: 41

Glu Val Gln Leu Val Glu Ser Gly Gly Gly Leu Val Gln Pro Gly Gly

-continued

```
1               5                   10                  15
Ser Leu Arg Leu Ser Cys Ala Ala Ser Gly Phe Thr Phe Ser Thr Tyr
            20                  25                  30

Ala Met Asn Trp Val Arg Gln Ala Pro Gly Lys Gly Leu Glu Trp Val
            35                  40                  45

Gly Arg Ile Arg Ser Lys Tyr Asn Asn Tyr Ala Thr Tyr Tyr Ala Asp
            50                  55                  60

Ser Val Lys Gly Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                    85                  90                  95

Tyr Cys Val Arg His Gly Asn Phe Gly Asp Ser Tyr Val Ser Trp Phe
                    100                 105                 110

Ala Tyr Trp Gly Gln Gly Thr Leu Val Thr Val Ser Ser Gly Lys Pro
            115                 120                 125

Gly Ser Gly Lys Pro Gly Ser Gly Lys Pro Gly Ser Gly Lys Pro Gly
130                 135                 140

Ser Gln Ala Val Val Thr Gln Glu Pro Ser Leu Thr Val Ser Pro Gly
145                 150                 155                 160

Gly Thr Val Thr Leu Thr Cys Gly Ser Ser Thr Gly Ala Val Thr Thr
                    165                 170                 175

Ser Asn Tyr Ala Asn Trp Val Gln Gln Lys Pro Gly Lys Ser Pro Arg
            180                 185                 190

Gly Leu Ile Gly Gly Thr Asn Lys Arg Ala Pro Gly Val Pro Ala Arg
            195                 200                 205

Phe Ser Gly Ser Leu Leu Gly Gly Lys Ala Ala Leu Thr Ile Ser Gly
            210                 215                 220

Ala Gln Pro Glu Asp Glu Ala Asp Tyr Tyr Cys Ala Leu Trp Tyr Ser
225                 230                 235                 240

Asn His Trp Val Phe Gly Gly Gly Thr Lys Leu Thr Val Leu Glu Pro
                    245                 250                 255

Lys Ser Ser Asp Lys Thr His Thr Cys Pro Pro Cys Pro Ala Pro Pro
            260                 265                 270

Val Ala Gly Pro Ser Val Phe Leu Phe Pro Pro Lys Pro Lys Asp Thr
            275                 280                 285

Leu Met Ile Ser Arg Thr Pro Glu Val Thr Cys Val Val Val Asp Val
            290                 295                 300

Lys His Glu Asp Pro Glu Val Lys Phe Asn Trp Tyr Val Asp Gly Val
305                 310                 315                 320

Glu Val His Asn Ala Lys Thr Lys Pro Arg Glu Glu Gln Tyr Asn Ser
                    325                 330                 335

Thr Tyr Arg Val Val Ser Val Leu Thr Val Leu His Gln Asp Trp Leu
            340                 345                 350

Asn Gly Lys Glu Tyr Lys Cys Lys Val Ser Asn Lys Ala Leu Pro Ala
            355                 360                 365

Pro Ile Glu Lys Thr Ile Ser Lys Ala Lys Gly Gln Pro Arg Glu Pro
            370                 375                 380

Gln Val Tyr Thr Leu Pro Pro Ser Arg Glu Gln Met Thr Lys Asn Gln
385                 390                 395                 400

Val Lys Leu Thr Cys Leu Val Lys Gly Phe Tyr Pro Ser Asp Ile Ala
                    405                 410                 415

Val Glu Trp Glu Ser Asn Gly Gln Pro Glu Asn Asn Tyr Lys Thr Thr
            420                 425                 430
```

```
Pro Pro Val Leu Asp Ser Asp Gly Ser Phe Phe Leu Tyr Ser Lys Leu
        435                 440                 445

Thr Val Asp Lys Ser Arg Trp Gln Gln Gly Asn Val Phe Ser Cys Ser
    450                 455                 460

Val Met His Glu Ala Leu His Asn His Tyr Thr Gln Lys Ser Leu Ser
465                 470                 475                 480

Leu Ser Pro Gly Lys
            485

<210> SEQ ID NO 42
<211> LENGTH: 220
<212> TYPE: PRT
<213> ORGANISM: Artificial Sequence
<220> FEATURE:
<223> OTHER INFORMATION: Synthetic Polypeptide

<400> SEQUENCE: 42

Asp Phe Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Asn Thr
            20                  25                  30

Gly Asn Gln Lys Asn Tyr Leu Thr Trp Tyr Gln Gln Lys Pro Gly Gln
        35                  40                  45

Pro Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Leu Gln Ala Glu Asp Val Ala Val Tyr Tyr Cys Gln Asn
                85                  90                  95

Asp Tyr Ser Tyr Pro Tyr Thr Phe Gly Gly Gly Thr Lys Leu Glu Ile
            100                 105                 110

Lys Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
    130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220
```

ANTI-CD3 AND ANTI-CD123 BISPECIFIC ANTIBODY AND USE THEREOF

CROSS REFERENCE TO RELATED APPLICATION

The present application is a U.S. National Stage of International Application Patent No. PCT/CN2020/082151, filed on Mar. 30, 2020, which claims the benefit of and priority to Chinese Patent Application No. 202010080449.9, filed on Feb. 5, 2020, both of which are incorporated herein by reference in their respective entireties.

SEQUENCE LISTING

The instant application contains a Sequence Listing which has been submitted in ASCII format via EFS-Web and is hereby incorporated by reference in its entirety. Said ASCII copy, created on Aug. 4, 2022, is named 078291-000296USPX SL.txt and is 61,673 bytes in size.

TECHNICAL FIELD

The present application generally relates to the field of antibody drugs. In particular, the present application relates to a bispecific antibody comprising an antigen-binding portion against human CD3E and/or an antigen-binding portion against human CD123 and medical and biological uses thereof.

BACKGROUND OF THE INVENTION

A bispecific antibody (BsAb) is a type of artificial antibodies that comprise two different antigen binding sites. Bispecific antibodies are widely used in the field of biomedicine, especially tumor immunotherapy. One arm of the bispecific antibodies targeting CD3 can bind to the CD3E subunit in TCR receptor complex on the surface of T cells, and the other arm targets a tumor antigen. In this way, bispecific antibodies can redirect T cells to specifically kill tumor cells in a histocompatibility complex (MHC)-independent manner.

There are numerous platforms for bispecific antibodies and their structures are complex. In terms of antibody structures, the bispecific antibodies can be divided into two categories: those with Fc fragments and those without Fe fragments. The bispecific antibodies without Fe fragments consist of the VH and VL regions or Fab fragments derived from two antibodies. The main representatives of such bispecific antibodies include BiTE, DART™ dual-affinity re-targeting antibody, TandAbs, Bi-Nanobody® (single-domain antibody, VHH), and the like. The advantage of such bispecific antibodies is that there is no mismatch between heavy and light chains. The disadvantages are that their half-life is short and it is inconvenient when they are used in clinical applications. The bispecific antibodies with Fc fragments retain the structures of conventional monoclonal antibodies and can mediate the biological function of the Fc fragment. The representatives of such bispecific antibodies include KIH IgG, crossmab, DVD-Ig™ dual variable domain immunoglobulin, Triomab® trifunctional bispecific antibody, and the like, which have a long half-life in vivo and can have ADCC and CDC activities (see Hongyan Liu, Abhishek Saxena, Sachdev S. Sidhu, et al. Fc engineering for Developing Therapeutic Bispecific Antibodies and Novel Scaffolds. *Front. Immunol.* 2017; 8: 38).

Therefore, in view of the wide applicability of bispecific antibodies, there is a need to develop new bispecific antibodies in the art.

SUMMARY OF THE INVENTION

In a first aspect, there is provided in the present application a bispecific antibody comprising an antigen-binding portion against human CD3E, wherein the antigen-binding portion against human CD3E comprises:
  HCDR1 (heavy chain CDR1) as set forth in SEQ ID NO:1,
  HCDR2 (heavy chain CDR2) as set forth in SEQ ID NO:2,
  HCDR3 (heavy chain CDR3) as set forth in SEQ ID NO:3,
  LCDR1 (light chain CDR1) as set forth in SEQ ID NO:4,
  LCDR2 (light chain CDR2) as set forth in SEQ ID NO:5, and
  LCDR3 (light chain CDR3) as set forth in SEQ ID NO:6;
  wherein HCDRs and LCDRs are defined according to Kabat.

In a second aspect, there is provided in the present application a bispecific antibody comprising an antigen-binding portion against human CD123, wherein the antigen-binding portion against human CD123 comprises:
  HCDR1 (heavy chain CDR1) as set forth in SEQ ID NO:7,
  HCDR2 (heavy chain CDR2) as set forth in SEQ ID NO:8,
  HCDR3 (heavy chain CDR3) as set forth in SEQ ID NO:9,
  LCDR1 (light chain CDR1) as set forth in SEQ ID NO:4,
  LCDR2 (light chain CDR2) as set forth in SEQ ID NO:5, and
  LCDR3 (light chain CDR3) as set forth in SEQ ID NO:6;
  wherein HCDRs and LCDRs are defined according to Kabat.

In a third aspect, there is provided in the present application a bispecific antibody comprising an antigen-binding portion against human CD3E and an antigen-binding portion against human CD123. In some embodiments of the third aspect, the antigen-binding portion against human CD3E comprises:
  HCDR1 as set forth in SEQ ID NO:1,
  HCDR2 as set forth in SEQ ID NO:2,
  HCDR3 as set forth in SEQ ID NO:3,
  LCDR1 as set forth in SEQ ID NO:4,
  LCDR2 as set forth in SEQ ID NO:5, and
  LCDR3 as set forth in SEQ ID NO:6;
  wherein HCDRs and LCDRs are defined according to Kabat.

In some embodiments of the third aspect, the antigen-binding portion against human CD123 comprises:
  HCDR1 as set forth in SEQ ID NO:7,
  HCDR2 as set forth in SEQ ID NO:8,
  HCDR3 as set forth in SEQ ID NO:9,
  LCDR1 as set forth in SEQ ID NO:4,
  LCDR2 as set forth in SEQ ID NO:5, and
  LCDR3 as set forth in SEQ ID NO:6;
  wherein HCDRs and LCDRs are defined according to Kabat.

In some embodiments of the third aspect, the antigen-binding portion against human CD3E and the antigen-binding portion against human CD123 comprise the same light chain variable region.

In some embodiments of the third aspect, the bispecific antibody is an IgG1 antibody comprising two heavy chain constant regions having the same hinge region, and the amino acid sequence of the hinge region is set forth in SEQ ID NO:10.

In some embodiments of the third aspect, the bispecific antibody is an IgG1 antibody comprising a first heavy chain constant region and a second heavy chain constant region, wherein the amino acids at positions 354 and 366 of the first heavy chain constant region are C and W, respectively, and the amino acids at positions 349, 366, 368 and 407 of the second heavy chain constant region are C, S, A and V, respectively; wherein the amino acid positions of the antibody constant region are determined according to EU numbering.

In some embodiments of the third aspect, the bispecific antibody is an IgG1 antibody comprising a first heavy chain constant region and a second heavy chain constant region, wherein the amino acids at positions 234, 235 and 331 of the first and second heavy chain constant regions are F, E, and S, respectively; wherein the amino acid positions of the antibody constant region are determined according to EU numbering.

In some embodiments of the first and third aspects, the antigen-binding portion against human CD3E comprises a heavy chain variable region as set forth in SEQ ID NO:11 and a light chain variable region as set forth in SEQ ID NO:12.

In some embodiments of the second and third aspects, the antigen-binding portion against human CD123 comprises a heavy chain variable region as set forth in SEQ ID NO:13 and a light chain variable region as set forth in SEQ ID NO:12.

In some embodiments of any one of the above aspects, the antigen-binding portion against human CD3E comprises a single chain fragment variable (scFv) or a Fab fragment.

In some embodiments of any one of the above aspects, the antigen-binding portion against human CD123 comprises a single chain fragment variable (scFv) or a Fab fragment.

In some embodiments of the third aspect, the antibody has a first arm and a second arm, wherein the first arm comprises an antigen-binding portion against human CD3E and the second arm comprises an antigen-binding portion against human CD123:
the first arm comprises the amino acid sequence of the heavy chain variable region as set forth in SEQ ID NO:11, the amino acid sequence of the heavy chain constant region as set forth in SEQ ID NO:31, the amino acid sequence of the light chain variable region as set forth in SEQ ID NO:12, and the amino acid sequence of the light chain constant region as set forth in SEQ ID NO:32;
the second arm comprises the amino acid sequence of the heavy chain variable region as set forth in SEQ ID NO:13, the amino acid sequence of the heavy chain constant region as set forth in SEQ ID NO:30, the amino acid sequence of the light chain variable region as set forth in SEQ ID NO:12, and the amino acid sequence of the light chain constant region as set forth in SEQ ID NO:32.

In a fourth aspect, there is provided in the present application a pharmaceutical composition comprising the bispecific antibody of any one of the first aspect to the third aspect.

In some embodiments of the fourth aspect, the pharmaceutical composition is used for the prevention or treatment of a CD123-positive tumor.

In a fifth aspect, there is provided in the present application use of the bispecific antibody of any one of the first aspect to the third aspect, or the pharmaceutical composition of the fourth aspect in the manufacture of a medicament for the prevention or treatment of a CD123-positive tumor.

In a sixth aspect, there is provided in the present application a method of preventing or treating a CD123-positive tumor comprising administering to a subject in need thereof the bispecific antibody of any one of the first aspect to the third aspect, or the pharmaceutical composition of the fourth aspect.

DESCRIPTION OF SEQUENCES

Figure 1:
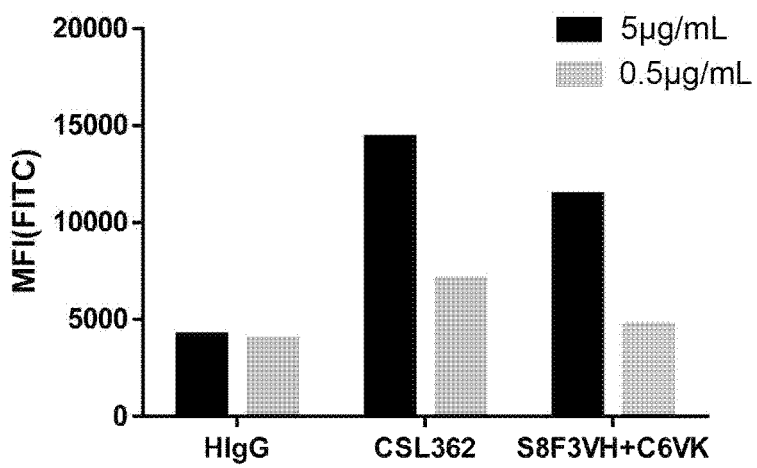
FIG. 1 shows the results of the specific binding of the recombinant anti-CD123 monoclonal antibody to CD123 on the cell surface analyzed by using flow cytometer.

SEQ ID NO:1 shows the amino acid sequence of HCDR1 of the heavy chain variable region H3B8 of the anti-human CD3E monoclonal antibody H3B8+L27E5.

SEQ ID NO:2 shows the amino acid sequence of HCDR2 of the heavy chain variable region H3B8 of the anti-human CD3E monoclonal antibody H3B8+L27E5.

SEQ ID NO:3 shows the amino acid sequence of HCDR3 of the heavy chain variable region H3B8 of the anti-human CD3E monoclonal antibody H3B8+L27E5.

SEQ ID NO:4 shows the amino acid sequence of LCDR1 of the light chain variable region L27E5.

SEQ ID NO:5 shows the amino acid sequence of LCDR2 of the light chain variable region L27E5.

SEQ ID NO:6 shows the amino acid sequence of LCDR3 of the light chain variable region L27E5.

SEQ ID NO:7 shows the amino acid sequence of HCDR1 of the heavy chain variable region H7A3-h2-m5 of the anti-human CD123 monoclonal antibody H7A3-h2-m5+L27E5.

SEQ ID NO:8 shows the amino acid sequence of HCDR2 of the heavy chain variable region H7A3-h2-m5 of the anti-human CD123 monoclonal antibody H7A3-h2-m5+L27E5.

SEQ ID NO:9 shows the amino acid sequence of HCDR3 of the heavy chain variable region H7A3-h2-m5 of the anti-human CD123 monoclonal antibody H7A3-h2-m5+L27E5.

SEQ ID NO:10 shows the amino acid sequence of the hinge region.

SEQ ID NO:11 shows the amino acid sequence of the humanized heavy chain mutant H3B8 of the rat monoclonal antibody WM03-C6.

SEQ ID NO:12 shows the amino acid sequence of the humanized light chain mutant L27E5 of the rat monoclonal antibody WM03-C6.

SEQ ID NO:13 shows the amino acid sequence of the humanized version H7A3-h2-m5.

SEQ ID NO:14 shows the amino acid sequence of the extracellular region of human (*Homo sapiens*) CD3E (hCD3E).

SEQ ID NO:15 shows the amino acid sequence of the extracellular region of human (*Homo sapiens*) CD3D (hCD3D).

SEQ ID NO:16 shows the amino acid sequence of the extracellular region of cynomolgus monkey (*Macaca fascicularis*) CD3E (mfCD3E).

SEQ ID NO:17 shows the amino acid sequence of the extracellular region of cynomolgus monkey (*Macaca fascicularis*) CD3D (mfCD3D).

SEQ ID NO:18 shows the amino acid sequence of the extracellular region of mouse (*Mus musculus*) CD3E (mCD3E).

SEQ ID NO:19 shows the amino acid sequence of the extracellular region of mouse (*Mus musculus*) CD3D (mCD3D).

SEQ ID NO:20 shows the amino acid sequence of the extracellular region of human (*Homo sapiens*) CD123 subtype 1 (hCD123-SP1).

SEQ ID NO:21 shows the amino acid sequence of the extracellular region of cynomolgus monkey (*Macaca fascicularis*) CD123 subtype 1 (mfCD123-SP1).

SEQ ID NO:22 shows the amino acid sequence of the extracellular region of mouse (*Mus musculus*) CD123 subtype 1 (mCD123-SP1).

SEQ ID NO:23 shows the amino acid sequence of His tag.

SEQ ID NO:24 shows the amino acid sequence of Fc region of mouse (*Mus musculus*) antibody IgG2a (mFc).

SEQ ID NO:25 shows the amino acid sequence of the Fc mutant FcK of a heterodimeric human IgG1 subtype.

SEQ ID NO:26 shows the amino acid sequence of the Fc mutant FcH of a heterodimeric human IgG1 subtype.

SEQ ID NO:27 shows the amino acid sequence of the heavy chain constant region of human (*Homo sapiens*) IgG1 subtype antibody.

SEQ ID NO:28 shows the amino acid sequence of the heavy chain constant region mutant IgG1H of human IgG1 subtype antibody.

SEQ ID NO:29 shows the amino acid sequence of the heavy chain constant region mutant IgG1K of human IgG1 subtype antibody.

SEQ ID NO:30 shows the amino acid sequence of the heavy chain constant region mutant IgG1m3-H of human IgG1 subtype antibody.

SEQ ID NO:31 shows the amino acid sequence of the heavy chain constant region mutant IgG1m3-K of human IgG1 subtype antibody.

SEQ ID NO:32 shows the amino acid sequence of the light chain constant region of human (*Homo sapiens*) kappa (κ) subtype.

SEQ ID NO:33 shows the amino acid sequence of the light chain constant region of human (*Homo sapiens*) lambda (λ) subtype.

SEQ ID NO: 34 shows the amino acid sequence of the heavy chain variable region of monoclonal antibody WM03-C6.

SEQ ID NO: 35 shows the amino acid sequence of the light chain variable region of monoclonal antibody WM03-C6.

SEQ ID NO:36 shows the amino acid sequence of the anti-human CD123 single chain fragment variable S8F3.

SEQ ID NO:37 shows the amino acid sequence of the heavy chain variable region S8F3VH of the anti-human CD123 single chain fragment variable S8F3.

SEQ ID NO:38 shows the amino acid sequence of the heavy chain of the anti-CD123 antibody CSL362.

SEQ ID NO:39 shows the amino acid sequence of the light chain of the anti-CD123 antibody CSL362.

SEQ ID NO:40 shows the amino acid sequence of the heavy chain binding to CD123 of Xmab14045 comprising the IgG1m3 subtype with a Hole mutation.

SEQ ID NO:41 shows the amino acid sequence of the scFv structure binding to CD3E of Xmab14045 comprising the IgG1m3 subtype with a Knob mutation.

SEQ ID NO:42 shows the amino acid sequence of the light chain of Xmab14045

DETAILED DESCRIPTION OF THE INVENTION

Definitions

The following definitions and methods are provided to better define the present application and guide those of ordinary skill in the art in the practice of the present application. Unless otherwise indicated, the terms used in the present application have the meanings commonly understood by those skilled in the art. All patent documents, academic papers, and other publications cited herein are incorporated by reference in their entirety.

When the structures of antibodies are described herein, reference is made to the EU numbering definition of the human IgG1 antibody with respect to the description on amino acid position numbering, which is well known and readily available to those skilled in the art. Furthermore, where a mutation is described herein in connection with the EU numbering position, it refers to a mutation produced relative to the native antibody sequence.

As used herein, the term "Fc fragment", "Fc domain", "Fc portion" or similar terms refer to a portion of the heavy chain constant region of an antibody, including the hinge region (hinge), the CH2 and CH3 segments of the constant region. With reference to the EU numbering definition of the human IgG1 antibody, the Fc fragment refers to the amino acid sequence at positions 216-447 in the constant region of the antibody.

As used herein, the term "Fab (fragment antigen-binding) fragment", "Fab portion", or similar terms refer to an antibody fragment capable of binding to an antigen that is produced by treatment of an intact antibody with papain, including the intact light chain (VL-CL), the heavy chain variable region, and the CH1 fragment (VH-CH1).

As used herein, the term "single chain fragment variable (scFv)" refers to an antibody having a single chain structure comprising a polypeptide chain comprising a heavy chain variable region (VH) and a light chain variable region (VL), which is generally constructed using genetic engineering techniques. A flexible linker is typically designed between the heavy chain variable region and the light chain variable region so that the heavy chain variable region and the light chain variable region can be folded into the correct conformation capable of binding to an antigen.

As used herein, the term "antigen-binding portion" refers to a portion of the antibody structure that determines the antigen-binding ability. It will be understood by those skilled in the art that the major parts of an antibody structure that determine the antigen-binding ability are the CDRs, so the CDRs are also the core components of the antigen-binding portion. In the construction of a bispecific antibody, the examples of the "antigen-binding portion" include, but are not limited to a single chain fragment variable (scFv) or a Fab fragment.

As used herein, the term "bispecific antibody" refers to an antibody having the ability to bind to two different antigens, which can consist of two Fc fragments and two antigen-binding portions fused thereto, respectively.

In some embodiments, "a bispecific antibody" used herein refers to a bispecific antibody based on the human IgG1 antibody, and in addition to the altered structures described herein, it has the basic characteristics and function of the human IgG1 antibody. It is well-known to those skilled in the art that "a bispecific antibody" used herein can also be those based on other immunoglobulin subtypes, such as the human IgG2 antibody.

It is well known to those skilled in the art that the complementarity determining regions (CDRs, generally including CDR1, CDR2 and CDR3) are the regions of a variable region that have mostly impact on the affinity and specificity of an antibody. The CDR sequences of a VH or a VL have two common definitions, i.e., the Kabat definition and the Chothia definition (see, e.g., Kabat, "Sequences of Proteins of Immunological Interest", National Institutes of Health, Bethesda, Md. (1991); Al-Lazikani et al., J. Mol. Biol. 273:927-948 (1997); and Martin et al., Proc. Natl. Acad. Sci. USA, 86:9268-9272 (1989)). For the variable region sequences of a given antibody, the sequences of CDR regions in the VH and the VL can be determined according to the Kabat definition or the Chothia definition. In an embodiment of the present application, CDR sequences are defined according to the Kabat definition.

For the variable region sequences of a given antibody, the sequences of CDR regions in the variable region sequences can be analyzed in a variety of ways, for example, using online software Abysis (http://www.abysis.orgf).

As used herein, the term "specific binding" refers to a non-random binding reaction between two molecules, e.g., binding of an antibody to an antigen epitope.

CD3 molecule is an important differentiation antigen on T cell membrane and is also a characteristic marker of the mature T cells. CD3 molecule consists of four chains of γ, δ, ε and ζ, or five chains of γ, δ, ε, ζ and η (ζ and η are homologous isomers), is composed of three dimers of CD3γε, CD3δε and CD3ζζ (or CD3ζη) and expressed on T cell membrane. Three chains of CD3γ, δ and ε contain highly conserved acidic amino acid residues (glutamic acid in γ chain, and aspartic acid in δ and ε chains), which can be non-covalently linked to the basic amino acid residues on the α and β chains of the T cell receptor (TCR) by a salt bridge to form a stable TCR-CD3 complex structure. The complex can transmit T cell activation signals and stabilize the TCR structure. The intracellular domains of each chain of CD3 contain an ITAM (immune receptor tyrosine-based activation motif) structure, which is the basis for a CD3 molecule-mediated intracellular signaling. When the TCR specifically recognizes and binds to an antigen (an antigenic peptide presented by an MHC molecule), tyrosine protein kinases within T cells phosphorylate tyrosine residues on ITAM, and recruit tyrosine protein kinases containing SH2 domains (ZAP-70), thereby transducing the signal into the cytoplasm of T cells to initiate activation mechanism within the cells. Therefore, CD3 has the function of transmitting the activation signal generated after TCR recognizes the antigen and the signal is the first signal for inducing T cell activation.

CD123, also known as human interleukin-3 (IL-3) receptor alpha chain, is a member of the cytokine receptor superfamily with a molecular weight of about 40 KDa and belongs to a type I transmembrane glycoprotein. The interleukin-3 receptor is a heterodimer composed of an alpha chain (CD123) and a beta chain (CD131). After the binding of IL-3 to CD123, CD131 provides signal transduction, which in turn regulates the function of hematopoietic cells and immune cells and stimulates the proliferation of endothelial cells (Testa et al., Biomark Res. 2:4 (2014)).

CD123 is mainly expressed in a myeloid progenitor cell, a plasmacytoid dendritic cell, a monocyte, a basophil and a small subset of B cells (Munoz L et al., Haematologica. 86(12):1261-9). About 80% of AML patients have blasts that overexpress CD123, and studies have shown that overexpression of CD123 antigen corresponds to poor prognosis and lower remission rates in AML (Testa U et al., Blood. 2002; 100(8)). Although most AML patients respond well to initial therapy, some (60-80%) require consolidation therapy to achieve complete remission.

In a first aspect, there is provided in the present application a bispecific antibody comprising an antigen-binding portion against human CD3E, wherein the antigen-binding portion against human CD3E comprises:
HCDR1 as set forth in SEQ ID NO:1,
HCDR2 as set forth in SEQ ID NO:2,
HCDR3 as set forth in SEQ ID NO:3, LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In a second aspect, there is provided in the present application a bispecific antibody comprising an antigen-binding portion against human CD123, wherein the antigen-binding portion against human CD123 comprises:
HCDR1 as set forth in SEQ ID NO:7,
HCDR2 as set forth in SEQ ID NO:8,
HCDR3 as set forth in SEQ ID NO:9,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In a third aspect, there is provided in the present application a bispecific antibody comprising an antigen-binding portion against human CD3E and an antigen-binding portion against human CD123.

In some embodiments of the third aspect, the antigen-binding portion against human CD3E comprises:
HCDR1 as set forth in SEQ ID NO:1,
HCDR2 as set forth in SEQ ID NO:2,
HCDR3 as set forth in SEQ ID NO:3,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In some embodiments of the third aspect, the antigen-binding portion against human CD123 comprises:
HCDR1 as set forth in SEQ ID NO:7,
HCDR2 as set forth in SEQ ID NO:8,
HCDR3 as set forth in SEQ ID NO:9,
LCDR1 as set forth in SEQ ID NO:4,
LCDR2 as set forth in SEQ ID NO:5, and
LCDR3 as set forth in SEQ ID NO:6;
wherein HCDRs and LCDRs are defined according to Kabat.

In some embodiments of the third aspect, the antigen-binding portion against human CD3E and the antigen-binding portion against human CD123 comprise the same light chain variable region.

In some specific embodiments of the third aspect, the antigen-binding portion against human CD3E and the antigen-binding portion against human CD123 comprise the same light chain. This embodiment facilitates proper assembly of the light and heavy chains, and is also a preferred embodiment.

In some embodiments of the third aspect, the bispecific antibody is an IgG1 antibody comprising two heavy chain constant regions having the same hinge region, and the amino acid sequence of the hinge region is set forth in SEQ ID NO:10, which replaces the sequences at positions 216-230 of the constant region of the natural human IgG1 antibody. The amino acid positions of the antibody constant region are determined according to EU numbering.

In some embodiments of the third aspect, the bispecific antibody is an IgG1 antibody comprising a first heavy chain constant region and a second heavy chain constant region, wherein the amino acids at positions 354 and 366 of the first heavy chain constant region are C and W, respectively, and the amino acids at positions 349, 366, 368 and 407 of the second heavy chain constant region are C, S, A and V, respectively. The amino acid positions of the antibody constant region are determined according to EU numbering.

When a bispecific antibody that retains the Fc domain is constructed, the structure of the bispecific antibody can be optimized from the following two aspects: the first one is the heavy chain heteromerization and the second one is the proper assembly of the light and heavy chains. In some embodiments, two Fc fragments comprise mutations that can ensure heavy chain heteromerization. The KIH (knob-in-hole) technique is a strategy to address heavy chain heteromerization. Generally, the KIH technique refers to the formation of a structure that facilitates pairing of the heterologous halves to each other by modifying the amino acid sequence of the CH3 region, which can maintain the structure of the normal antibody as much as possible while promoting the formation of the bispecific antibody. In some embodiments, the KIH technique utilized includes allowing the amino acids at positions 354 and 366 of one Fc fragment to be C and W, respectively, and the amino acids at positions 349, 366, 368 and 407 of the other Fc fragment to be C, S, A and V, respectively. For guidance on the KIH technique, see, for example, "An efficient route to human bispecific IgG", A. Margaret Merchant et al., Nature Biotechnology, Volume 16, 1998", which is incorporated herein by reference in its entirety.

In some embodiments of the third aspect, the bispecific antibody is an IgG1 antibody comprising a first heavy chain constant region and a second heavy chain constant region, wherein the amino acids at positions 234, 235 and 331 of the first and second heavy chain constant regions are F, E, and S, respectively. The amino acid positions of the antibody constant region are determined according to EU numbering.

In some embodiments of the third aspect, the amino acids at positions 234, 235 and 331 of the CH2 fragments of the two heavy chain constant regions are F, E and S, respectively, which can reduce antibody dependent cytotoxicity (ADCC) mediated by the Fc fragment of an antibody, thereby potentially reducing side effects caused by the bispecific antibody in vivo. For guidance on the above mutations, see, for example, "The binding affinity of human IgG for its high affinity Fc receptor is determined by multiple amino acids in the CH2 domain and is modulated by the hinge region", Stephen M. Canfield et al., J. Exp. Med. Volume 173, 1991, which is incorporated herein by reference in its entirety.

In some embodiments of the first and third aspects, the antigen-binding portion against human CD3E comprises a heavy chain variable region as set forth in SEQ ID NO:11 (comprising HCDR1 as set forth in SEQ ID NO: 1, HCDR2 as set forth in SEQ ID NO: 2 and HCDR3 as set forth in SEQ ID NO:3) and a light chain variable region as set forth in SEQ ID NO:12 (comprising LCDR1 as forth in SEQ ID NO:4, LCDR2 as set forth in SEQ ID NO:5 and LCDR3 as set forth in SEQ ID NO:6).

In some embodiments of the second and third aspects, the antigen-binding portion against human CD123 comprises a heavy chain variable region as set forth in SEQ ID NO:13 (comprising HCDR1 as set forth in SEQ ID NO: 7, HCDR2 as set forth in SEQ ID NO: 8 and HCDR3 as set forth in SEQ ID NO:9) and a light chain variable region as set forth in SEQ ID NO:12 (comprising LCDR1 as forth in SEQ ID NO:4, LCDR2 as set forth in SEQ ID NO:5 and LCDR3 as set forth in SEQ ID NO:6).

In some embodiments of any one of the above aspects, the antigen-binding portion against human CD3E comprises a single chain fragment variable (scFv) or a Fab fragment.

In some embodiments of any one of the above aspects, the antigen-binding portion against human CD123 comprises a single chain fragment variable (scFv) or a Fab fragment.

As a bispecific antibody has two different antigen-binding portions against two different antigens, and the antigen-binding portions can comprise two forms, i.e., a single chain fragment variable (scFv) or a Fab fragment, the configuration of antigen-binding portions of the bispecific antibody can have four combinations for given two antigens: Fab+Fab, Fab+scFv, scFv+Fab, and scFv+scFv.

In some specific embodiments of any one of the above aspects, the antigen-binding portion against human CD3E comprises a Fab fragment and the antigen-binding portion against human CD123 comprises a Fab fragment.

In some specific embodiments of any one of the above aspects, the antigen-binding portion against human CD3E comprises a Fab fragment and the antigen-binding portion against human CD123 comprises a single chain fragment variable (scFv).

In some specific embodiments of any one of the above aspects, the antigen-binding portion against human CD3E comprises a single chain fragment variable (scFv) and the antigen-binding portion against human CD123 comprises a Fab fragment.

In some specific embodiments of any one of the above aspects, the antigen-binding portion against human CD3E comprises a single chain fragment variable (scFv) and the antigen-binding portion against human CD123 comprises a single chain fragment variable (scFv).

The bispecific antibody is also described herein as having two "arms". The bispecific antibody can be divided into two arms from the central portion. The arms of the bispecific antibody can consist of an Fc fragment and an antigen-binding portion (a Fab fragment or a single chain fragment variable). For the arm consisting of an Fc fragment and a Fab fragment, its structure is similar to that of a common antibody, comprising intact heavy and light chains, and thus the structure of such arm can be represented as Fc+Fab, or can be represented as a heavy chain (Fc+the heavy chain variable region of Fab and CH1 fragment)+a light chain (the light chain portion of Fab). When both arms contain the antigen-binding portions in the form of Fab fragment, the structure of the bispecific antibody thus formed is close to that of a native antibody and is a preferred embodiment.

In some embodiments of the third aspect, the antibody has a first arm and a second arm, wherein the first arm comprises an antigen-binding portion against human CD3E and the second arm comprises an antigen-binding portion against human CD123:

the first arm comprises the amino acid sequence of the heavy chain variable region as set forth in SEQ ID NO:11, the amino acid sequence of the heavy chain constant region as set forth in SEQ ID NO:31, the amino acid sequence of the light chain variable region as set forth in SEQ ID NO:12, and the amino acid sequence of the light chain constant region as set forth in SEQ ID NO:32;

the second arm comprises the amino acid sequence of the heavy chain variable region as set forth in SEQ ID NO:13, the amino acid sequence of the heavy chain constant region as set forth in SEQ ID NO:30, the amino acid sequence of the light chain variable region as set forth in SEQ ID NO:12, and the amino acid sequence of the light chain constant region as set forth in SEQ ID NO:32.

In some embodiments of any one of the above aspects, the heavy chain constant region of the bispecific antibody is human IgG1 subtype or various mutants of a selected human IgG1 subtype, such as IgG1H, IgG1K, IgG1m3-H, or IgG1m3-K.

In some embodiments of any one of the above aspects, the light chain constant region of the bispecific antibody is human κ subtype or human λ subtype, preferably human κ subtype.

In a fourth aspect, there is provided in the present application a pharmaceutical composition comprising the bispecific antibody of any one of the first aspect to the third aspect.

In some embodiments, the pharmaceutical composition further comprises a pharmaceutically acceptable carrier, excipient, diluent, and the like.

In some embodiments, the pharmaceutical composition is used to prevent or treat CD123-positive tumors, for example, acute myeloid leukemia (AML) and blastic plasmacytoid dendritic cell tumors (BPDCN).

In some embodiments, the pharmaceutical composition can further comprise a lubricant, such as talc, magnesium stearate, and mineral oil; a wetting agent; an emulsifier; a suspending agent; a preservative, such as benzoic acid, sorbic acid and calcium propionate; a sweetening agent and/or a flavoring agent and the like.

In some embodiments, the pharmaceutical composition of the present application can be formulated as a tablet, a pill, a powder, a lozenge, an elixir, a suspension, an emulsion, a solution, a syrup, a suppository, or a capsule and the like.

In some embodiments, the pharmaceutical composition of the present application can be delivered using any physiologically acceptable administration route including, but not limited to, oral administration, parenteral administration, nasal administration, rectal administration, intraperitoneal administration, intravascular injection, subcutaneous administration, transdermal administration, inhalation administration and the like.

In some embodiments, a pharmaceutical composition for therapeutic use can be formulated for storage in a lyophilized formulation or in the form of an aqueous solution by mixing an agent with desired purity with a pharmaceutically acceptable carrier or excipient where appropriate.

In a fifth aspect, there is provided in the present application use of the bispecific antibody of any one of the first aspect to the third aspect, or the pharmaceutical composition of the fourth aspect in the manufacture of a medicament for the prevention or treatment of a CD123-positive tumor.

In some embodiments of the fifth aspect, the CD123 positive tumor is selected from the group consisting of acute myeloid leukemia (AMIL) and blastic plasmacytoid dendritic cell tumors (BPDCN).

In a sixth aspect, there is provided in the present application a method of preventing or treating a CD123 positive tumor, comprising administering to a subject in need thereof the bispecific antibody of any one of the first aspect to the third aspect, or the pharmaceutical composition of the fourth aspect.

In some embodiments of the sixth aspect, the CD123 positive tumor is selected from the group consisting of acute myeloid leukemia (AML) and blastic plasmacytoid dendritic cell tumors (BPDCN).

It is to be understood that the foregoing detailed description is intended only to enable those skilled in the art to have better understanding of the present application and is not intended to limit it in any way. Various modifications and variations can be made to the described embodiments by those skilled in the art.

The following examples are used for purposes of illustration only and are not intended to limit the scope of the present application.

EXAMPLES

Example 1: Preparation of Recombinant Proteins

Many different recombinant proteins were required in the preparation and identification of a CD3E×CD123 bispecific antibody, including the extracellular region of human CD3E (hCD3E, SEQ ID NO:14), the extracellular region of human CD3D (hCD3D, SEQ ID NO:15), the extracellular region of monkey CD3E (mfCD3E, SEQ ID NO: 16), the extracellular region of monkey CD3D (mfCD3D, SEQ ID NO:17), the extracellular region of mouse CD3E (mCD3E, SEQ ID NO:18), the extracellular region of mouse CD3D (mCD3D, SEQ ID NO:19) and the extracellular region of human CD123 subtype 1 (hCD123-SP1, SEQ ID NO:20), the extracellular region of monkey CD123 subtype 1 (mfCD123-SP1, SEQ ID NO:21), and the extracellular region of mouse CD123 subtype 1 (mCD123-SP1, SEQ ID NO:22). These recombinant proteins all have a large number of post-translational modifications (e.g., glycosylation or disulfide bonds, etc.), and thus the use of the mammal cell expression system would be more advantageous in maintaining the structures and functions of the recombinant proteins. Furthermore, for ease of purification, His tags (SEQ ID NO:23) or Fc fragments of mouse antibody IgG2a (mFc, SEQ ID NO:24) were added to the C-terminus of the non-antibody recombinant proteins, or Fc mutants (FcK, SEQ ID NO:25 or FcH, SEQ ID NO:26) of heterodimeric human IgG1 subtype were formed based on KIH (Knob-Into-Hole) technique. In the preparation of the recombinant antibody, the heavy chain constant region of the antibody can be human IgG1 subtype (SEQ ID NO:27) or various mutants of the selected human IgG1 subtype, such as IgG1H (SEQ ID NO:28), IgG1K (SEQ ID NO:29), IgG1m3-H (SEQ ID NO:30) or IgG1m3-K (SEQ ID NO:31), and the light chain constant region can be human κ subtype (SEQ ID NO:32) or human, subtype (SEQ ID NO:33).

Based on the amino acid sequences of various recombinant proteins of interest recorded in the Uniprot database, the genes (comprising His-tag, mFc or Fc encoding gene) of the above recombinant proteins were designed and synthesized. The synthesized genes encoding various recombinant proteins were cloned into proper eukaryotic expression vectors (such as pcDNA3.1 purchased from Invitrogen Inc.) by conventional molecular biology techniques. Then, liposomes (e.g., 293fectin from Invitrogen Inc.) or other transfection agents (such as PEI) were used to transfect the recombinant protein expression plasmids as prepared into HEK293 cells (such as HEK293F from Invitrogen Inc.). The cells were incubated in suspension under serum-free condition for 3-5 days. Then, the supernatant of the culture was harvested by centrifugation.

For recombinant proteins fused with His-tags, the recombinant proteins in the supernatant were further purified using metal chelate affinity chromatography column (such as HisTrap FF from GE Inc.). The recombinant proteins and antibodies fused with mFc were further purified using a Protein A/G affinity chromatography column (such as Mabselect SURE from GE Inc.). Then, the recombinant protein preservation buffer was then replaced with PBS buffer (pH 7.0) or other suitable buffers using a desalination column (such as Hitrap desaulting from GE Inc.). If necessary, the antibody samples can be sterilized by filtration and then stored in aliquots at −20° C.

Example 2: Construction of CD123 Mouse Immune Library Based on a Common Light Chain In order to construct a CD3E×CD123 bispecific antibody based on a common light chain, the light chain variable region of a specific anti-CD3E monoclonal antibody was selected to be matched with the mouse heavy chain variable region that has undergone in vivo affinity maturation of the CD123 antigen. A single chain fragment variable (scFv) library was constructed for screening specific antibodies against CD123 by conventional molecular biology means.

Splenocytes were collected after cross-immunization of 6-8 week old BALB/c mice with hCD123-SP1-His and mfCD123-SP1-His recombinant proteins. Mouse spleen lymphocytes were isolated using mouse lymphocyte separation agent (CAT #DKW33-R0100, DAKEWE). The isolated lymphocytes were subjected to total RNA extraction using total cell RNA extraction kit (CAT #DP430, TIANGEN BIOTECH (BEIJING) CO., LTD.). Using the extracted total RNA as a template, the heavy chain variable region of the antibody was synthesized using a first-strand cDNA synthesis kit (CAT #K1621, Thermo scientific). The light chain variable region of the rat monoclonal antibody WM03-C6 (referring to the sequence of the monoclonal antibody 20E5-F10 in the application WO_2016_116626_A1, in which the amino acid sequence of the heavy chain variable region is set forth in SEQ ID NO: 34, and the amino acid sequence of the light chain variable region is set forth in SEQ ID NO: 35) that specifically recognizes human and cynomolgus monkey CD3E, and the mouse heavy chain variable region, which was obtained by immunizing the mouse with the CD123 recombinant antigen, were obtained by using conventional molecular biology means, such as PCR amplification technique. Then a single chain fragment variable (scFv) was constructed using the overlap extension PCR technique. A scFv library was constructed by cloning the prepared gene encoding the mouse single chain fragment variable into the vector pADSCFV-S (for the experimental technical process, referring to Example 1 of Chinese Patent Application No. 201510097117.0). The capacity of this antibody library reaches 1.2×10E8, and the correct rate is 65%.

Example 3: Screening of CD123 Mouse Immune Library Having a Common Light Chain 3.1 Screening of an Anti-Human CD123 Mouse Single Chain Fragment Variable The phage library constructed in Example 2 to display mouse single chain fragment variable was screened by the solid-phase screening strategy using the recombinant hCD123-SP1-His prepared in Example 1 as the antigen (for the experimental protocol, referring to Phage Display: General Experimental Guide, Clackson, T. (USA) and Lowman, H. B. (USA) (Ed.); translated by Lan Ma et al., Chemical Industry Press Co., Ltd., May, 2008). One single chain fragment variable S8F3 (SEQ ID NO: 36) specifically binding to human CD123 was obtained by carried out a total of three rounds of screening including binding, elution, neutralization, infection and amplification.

The nucleotide sequences encoding the heavy chain variable region S8F3VH of S8F3 (SEQ ID NO:37) and the light chain variable region WM03-C6VK (SEQ ID NO:35) were cloned into a eukaryotic expression vector (such as pcDNA3.1 from Invitrogen, etc.) fused with the nucleotide sequences encoding a human heavy chain constant region and a light chain constant region using conventional molecular biology means to express the whole antibody S8F3VH+ C6VK in combination. Meanwhile, the anti-CD123 antibody CSL362 (the amino acid sequence of the heavy chain was set forth in SEQ ID NO: 38, and the amino acid sequence of the light chain was set forth in SEQ ID NO: 39) was prepared as a positive control antibody for subsequent research with reference to US patent US_2014_0178364_A1.

3.2 Affinity Analysis of the Recombinant Anti-CD123 Monoclonal Antibody

The affinity of anti-CD123 antibodies was determined by surface plasmon resonance using Biacore X100. Related reagents and consumables such as Amino Conjugation Kit (BR-1000-50), Human Antibody Capture Kit (BR-1008-39), CM5 Chip (BR100012) and 10×HBS-EP (BR100669) buffer with pH 7.4 were all purchased from GE healthcare. According to the instructions in the kits, 1-Ethyl-3-(3-dimethylaminopropyl) carbodiimide hydrochloride (EDC) and N-Hydroxysuccinimide (NHS) was used to activate the surface of the carboxylated CM5 chip, and the anti-human IgG (Fc) antibody (capture antibody) was diluted to 25 µg/mL with 10 mM, pH5.0 sodium acetate, followed by an injection with a flow rate at 10 µL/min to achieve a coupling volume of approximately 10,000 response units (RU). Following the injection of the capture antibody, 1 M ethanolamine was injected to block unreacted groups. For kinetic measurements, the anti-CD123 antibodies (S8F3VH+C6VK and CSL362) were diluted to 0.5-1 µg/mL and injected at 10 µL/min to ensure that about 100RU of the antibody was captured by the anti-human Fc antibody. Then hCD123-SP1-his was diluted to a series of concentration gradients (such as 2.47 nM, 7.4 nM, 22.2 nM, 66.7 nM, and 200 nM), and injected from low to high concentrations at 30 µL/min at 25° C. with a binding time of 120 s and a dissociation time of 600-2400 s. The chip surface was regenerated by injecting 3M MgCl$_2$ solution at 10 µL/min for 30 s. Association rates ($K_{on}$) and dissociation rates ($K_{off}$) were calculated from association and dissociation sensorgrams fitted by a 1:1 binding model using Biacore X100 evaluation software version 2.0.1. The dissociation equilibrium constant ($K_D$) was calculated as the ratio $K_{off}/K_{on}$. The fitting results are shown in Table 1.

TABLE 1

Affinity constants of the binding of the recombinant anti-CD123 monoclonal antibody to hCD123-SP1-his

| | $K_{on}$ | $K_{off}$ | $K_D$ |
|---|---|---|---|
| S8F3VH + C6VK | 4.546E+5 | 3.651E−3 | 8.030E−9 |
| CSL362 | 1.324E+5 | 7.931E−5 | 5.991E−10 |

3.3 Identification of the Binding of the Recombinant Anti-CD123 Monoclonal Antibody to Cell Surface CD123 Antigen KG-1a cells (Human Acute Myeloid Leukemia Cells, purchased from the Cell Resource Center of Institute of Basic Medicine, Chinese Academy of Medical Sciences) at logarithmic phase of growth were used and resuspended to 2×10$^6$ cells/mL with PBS buffer containing 1% BSA after centrifugation. KG-1a cells were plated in a 96-well V-bottom plate at 100 µL/well, and the supernatant was removed after centrifugation. The sample S8F3VH+C6VK to be tested, the control sample CSL362 and the irrelevant antibody HIgG (human IgG control (whole molecule), Purifie, A01006, GenScript) were prepared with PBS buffer to final concentrations of 5 µg/mL and 0.5 µg/mL, respectively. The antibodies were added to the wells containing cells and incubated at 4° C. for 1 hr. Then, the plate was washed three times with 200 µL of PBS buffer. The goat anti-human IgG-FITC secondary antibody (ZF-0308, ZSGB-BIO) was added to the wells (100 µL/well), and incubated at 4° C. for 30 minutes in the dark. Then, the cells were washed three times with 200 µL of PBS buffer, and resuspended in 100 µL of PBS buffer to detect FITC channel by flow cytometer (ACEA, Novocyte). The results showed that S8F3VH+ C6VK could specifically bind to CD123-positive cell KG-1a (FIG. 1).

Example 4: Humanization and Activity Identification of WM03-C6 Monoclonal Antibody 4.1 Humanized Design of WM03-C6

Humanization studies were performed on the rat monoclonal antibody WM03-C6 to reduce its immunogenicity. The humanization protocol adopted the classic framework transplantation strategy (referring to J immunol. 169, 1119-1125, 2002). The heavy and light chain variable regions of WM03-C6 were respectively compared with the human antibody germline gene sequences in the IMGT database. The appropriate germline gene sequences were selected to provide the framework regions 1 to 3 (FR1+FR2+FR3) of the antibody, and the appropriate J region gene sequence was selected to provide framework region 4 (FR4). This template can be selected based on a variety of factors, such as relative overall length of the antibody, size of the CDRs, amino acid residues located at the junction between the framework regions (FR) and hypervariable regions (CDR) of the antibody, global homology between sequences and the like. The selected template can be a mixture of multiple sequences or can be a consensus template, so long as the proper conformation of the parental complementarity determining regions (CDRs) is maintained as far as possible. At the same time, the mutants of the light and heavy chains of the humanized antibody were designed in order to avoid the possible protein heterogeneity caused by the deamination site NG in the hypervariable regions (CDRs) of the antibody. Finally, a humanized light chain mutant L27E5 (SEQ ID NO: 12) and a humanized heavy chain mutant H3B8 (SEQ ID NO: 11) were obtained.

4.2 Affinity Analysis of WM03-C6 Humanized Monoclonal Antibody

Referring to Example 3.2, the anti-human IgG (Fc) antibody was coupled to the surface of CM5 chip, the anti-CD3E antibodies (WM03-C6 and H3B8+L27E5) were diluted to 0.5-1 g/mL, and injected at 10 µL/min to ensure about 350-400RU of the antibodies were captured by anti-human Fc antibody. Then hCD3E-his was diluted to a series of concentration gradients (such as 6.17 nM, 18.5 nM, 55.6 nM, 167 nM, and 500 nM), and injected from low to high concentration at 30 µL/min at 25° C. with a binding time of 120 s and a dissociation time of 600-1800 s. The chip surface was regenerated by injecting 3M MgCl$_2$ solution at 10 L/min for 30 s. Association rates ($K_{on}$) and dissociation rates ($K_{off}$) were calculated from association and dissociation sensorgrams fitted by a 1:1 binding model using Biacore X100 evaluation software version 2.0.1. The dissociation equilibrium constant ($K_D$) was calculated as the ratio $K_{off}/K_{on}$. The fitting results are shown in Table 1.

TABLE 2

Affinity constants of the binding of WM03-C6
humanized monoclonal antibody to hCD3E-his

|  | $K_{on}$ | $K_{off}$ | KD |
|---|---|---|---|
| WM03-C6 | 2.716E+4 | 2.879E−4 | 1.060E−8 |
| H3B8 + L27E5 | 2.084E+4 | 9.928E−4 | 4.763E−8 |

Example 5: In Vitro Affinity Maturation of S8F3

The S8F3 heavy chain variable region was subjected to in vitro affinity maturation in order to improve the specificity of the bispecific antibody against the target antigen and enhance the tissue distribution and killing efficiency of the bispecific antibody during administration. A S8F3VH-based CDR3 mutation library was constructed by introducing mutations in the CDR3 of the S8F3 heavy chain variable region using conventional molecular biology means. The designed mutation scheme is shown in Table 3, the library capacity is 1.7×10E8, and the correct rate is 86%.

TABLE 3

The design scheme of S8F3VH-CDR3 mutation library

| Initial amino acid | Mutant amino acid | Degenerate code |
|---|---|---|
| L | L, F, V or I | NTC |
| R | R, T, K, S or N | AVW |
| Y | Y or F | TWC |
| G | G, S, D, N, I or V | RDT |
| N | N, D, T or A | RMC |
| Y | Y or F | TWC |
| G | G, V, A or D | GNT |
| D | D, N, Y, S, T or A | DMC |
| A | A, T, N, D, I or V | RHT |
| M | M, V, T, A, K or E | RHG |
| D | D, N, Y, S, T or A | DMC |
| D | D, Y, F or V | KWT |

Based on the dual-vector system for the phage display (referring to Example 5 in Chinese Patent Application No. 201510097117.0 for the experimental technical process), the constructed S8F3VH-CDR3 mutant library was subjected to three rounds of screening and enrichment with the hCD123-SP1 antigen by solid phase screening method. Finally, the heavy chain variable region mutant H7A3 (SEQ ID NO: 10) with increased affinity was obtained. The obtained nucleotide sequence encoding the H7A3 variable region was cloned into a eukaryotic expression vector fused with the nucleotide sequence encoding the human heavy chain constant region, and combined with the L27E5 light chain expression vector to express the whole antibody.

Referring to Example 3.2, the affinity assay was performed on the S8F3 heavy chain mutant H7A3 using Biacore X100, and the results are shown in Table 4.

TABLE 4

The affinity constants of the binding of the
S8F3 heavy chain mutants to hCD123-SP1-his

|  | $K_{on}$ | $K_{off}$ | KD |
|---|---|---|---|
| S8F3VH + L27E5 | 4.384E+4 | 1.455E−4 | 3.319E−9 |
| H7A3 + L27E5 | 2.698E+5 | 6.638E−5 | 2.46E−10 |

Example 6: Humanization of H7A3 and Activity Identification Thereof

A classical framework grafting strategy was used in the humanization of the anti-human CD123 murine monoclonal antibody heavy chain H7A3. Referring to Example 4, CDR transplantation was performed on the heavy chain variable region of H7A3 to obtain a humanized version H7A3VH-h2. At the same time, in order to ensure the conformation and affinity of the antibody, some key amino acids in the framework region of the humanized antibody such as I69, R71, T73, A75 were back mutated, and finally a humanized version H7A3-h2-m5 (SEQ ID NO: 13) was obtained. The antibody variable region gene was designed and synthesized according to the amino acid sequence of the humanized antibody, and cloned into a eukaryotic expression vector to combine with the common light chain L27E5 to express the whole antibody of human IgG1.

Referring to Example 3.2, the affinity assay was performed on H7A3 humanized version H7A3-h2-m5 using Biacore X100, and the results are shown in Table 5.

TABLE 5

The affinity constants of the binding of
H7A3 humanized version to hCD123-SP1-his

|  | $K_{on}$ | $K_{off}$ | $K_D$ |
|---|---|---|---|
| H7A3 + L27E5 | 3.054E+5 | 6.889E−5 | 2.256E−10 |
| H7A3-h2-m5 + L27E5 | 3.144E+5 | 7.671E−5 | 2.440E−10 |

Figure 2:
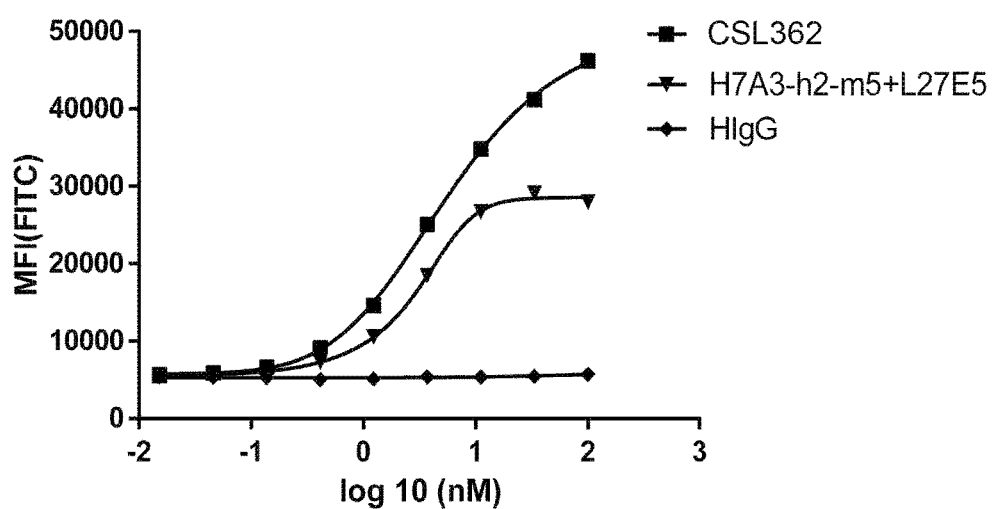
FIG. 2 shows the results of the binding of H7A3 humanized mutant H7A3-h2-m5+L27E5 to CD123 on the surface of MV-4-11 cells analyzed by using flow cytometry.

MV-4-11 cells (Human Acute Monocytic Leukemia Cells, purchased from COBIOER BIOSCIENCES CO., LTD) at logarithmic phase of growth were used and resuspended to $2 \times 10^6$ cells/well with PBS buffer containing 1% BSA after centrifugation. MV-4-11 cells were plated in a 96-well V-bottom plate at 100 μL/well, and the supernatant was removed after centrifugation. The sample H7A3-h2-m5+L27E5 to be tested, the control sample CSL362 and the irrelevant antibody HIgG (human IgG control (whole molecule), Purifie, A01006, GenScript) were prepared with PBS buffer to total 9 final concentrations with 100 nM as the starting concentration, followed by a 3-fold gradient dilution. The antibodies were added to the wells containing cells and incubated at 4° C. for 1 hour. Then, the plate was washed three times with 200 μL PBS buffer. The goat anti-human IgG-FITC secondary antibody (ZF-0308, ZSGB-BIO) was added to the wells (100 μL/well), and incubated at 4° C. for 30 minutes in the dark. Then, the cells were washed three times with 200 μL of PBS buffer, and resuspended in 100 μL of PBS buffer to detect FITC channel by flow cytometer (ACEA, Novocyte). The results were shown in FIG. 2, indicating that H7A3-h2-m5+L27E5 can bind to CD123-positive cells MV-4-11 well with a $K_D$ value of 3.1 nM.

Example 7: Preparation of Bispecific Antibodies

The nucleotide sequences encoding the heavy chain variable region H3B8 of the anti-CD3E monoclonal antibody and the heavy chain variable region H7A3-h2-m5 of the anti-CD123 monoclonal antibody were respectively cloned into suitable eukaryotic expression vectors to construct heterodimers based on a common light chain. That is, the nucleotide sequence encoding the heavy chain variable region of the anti-CD3E antibody was cloned into the eukaryotic expression vector fused with the nucleotide sequence encoding the IgG1 constant region with Knob mutation IgG1m3-K, the nucleotide sequence encoding the heavy chain variable region of the anti-CD123 antibody was cloned into the eukaryotic expression vector containing the nucleotide sequence encoding the IgG1 constant region with Hole mutation IgG1m3-H, and the nucleotide sequence encoding the variable region VK of the common light chain L27E5 was cloned into the eukaryotic expression vector fused with the nucleotide sequence encoding the human light chain constant region CK. At the same time, referring to patent WO 2017210443, Xmab14045 based on the same Fc structure (SEQ ID NO: 40, SEQ ID NO: 41, SEQ ID NO: 42) was constructed in order to compare the biological activity of the candidate molecule and the CD3E×CD123 bispecific antibody under clinical research.

The three constructed eukaryotic expression vectors expressing H3B8-IgG1m3-K, H7A3-h2-m5-IgG1m3-H and L27E5-CK were co-transfected into HEK293F cells using liposomes, and the cells were cultured in suspension in a serum-free medium for 3-5 days. The supernatant of the culture was harvested by centrifugation. The bispecific antibodies in the culture supernatant were purified using a Protein A/G affinity chromatography column (e.g., Mabselect SURE, GE Inc.). The recombinant protein preservation buffer was then replaced with PBS buffer (pH 7.0) or other suitable buffers using a desalination column (e.g., Hitrap desaulting, GE Inc.). The desalted protein solution was purified by a size exclusion chromatography (SEC) using Superdex 200 (GE), thereby obtaining the protein of interest. If necessary, the antibody samples can be sterilized by filtration and then stored in aliquots at −20° C. for later use.

Example 8: Affinity Assay of a Bispecific Antibody

Referring to Examples 3.2 and 4.2, the affinity assays were performed on the anti-CD3E monoclonal antibody H3B8+L27E5, the anti-CD123 monoclonal antibody H7A3-h2-m5+L27E5, the bispecific antibody CD3E×CD123 (CD3×CD123 BsAb) and the control antibody Xmab14045 by surface plasmon resonance technique using Biacore X100. The affinity fitting results are shown in Table 6 and Table 7.

TABLE 6

The affinity constants of the binding of the bispecific antibody CD3E × CD123 to hCD123-SP1-his

|  | $K_{on}$ | $K_{off}$ | $K_D$ |
| --- | --- | --- | --- |
| H7A3-h2-m5 + L27E5 | 2.337E+5 | 5.137E−5 | 2.198E−10 |
| CD3 × CD123 BsAb | 2.254E+5 | 4.015E−5 | 1.781E−10 |
| Xmab14045 | 9.671E+4 | 8.188E−5 | 8.467E−10 |

Figure 3:
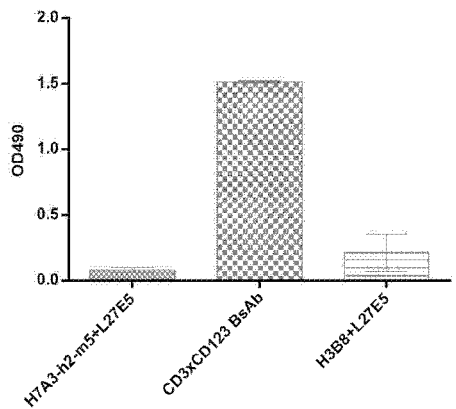
FIG. 3 shows the results of the binding of the bispecific antibody CD3E×CD123 to the two antigens CD3E and CD123 analyzed by ELISA.

Example 9: Identification of the Ability of the Bispecific Antibody to Simultaneously Recognize Both CD3E and CD123 Antigens The ability of the bispecific antibody CD3E×CD123 (CD3E×CD123 BsAb) to simultaneously bind to both CD3E and CD123 antigens was detected using conventional ELISA methods. A 96-well ELISA plate was coated with the antigen CD123-SP1-mFc (3 g/mL, 100 µL/well) overnight at 4° C. After being blocked with blocking solution PBS-0.1% Tween 20-3% milk at 37° C. for 1 hour, the anti-CD123 monoclonal antibody H7A3-h2-m5+L27E5, the anti-CD3E monoclonal antibody H3B8+L27E5 and the bispecific antibody CD3E×CD123 were respectively added to the wells in duplicate (10 µg/mL, 100 µL/well), and incubated at 37° C. for 1 hour. The ELISA plate was washed with PBS-0.1% Tween 20, followed by addition of CD123-His antigen (1 µg/mL, 100 µL/well) and incubation at 37° C. for 1 hour. The ELISA plate was washed with PBS-0.1% Tween 20, followed by addition of HRP mouse anti-his IgG (cw0285M, Beijing ComWin Biotech Co., Ltd.) and incubation at 37° C. for 1 hour. The ELISA plate was washed with PBS-0.1% Tween 20, and OPD substrate color development solution was added. The color development was terminated with 1 M $H_2SO_4$ after 5-10 minutes. The optical density values at 492 nm/630 nm dual wavelength were measured using a microplate reader. The result of ELISA assay was shown in FIG. 3. The bispecific antibody CD3E×CD123 simultaneously recognized both CD3E and CD123 antigens.

Example 10: Identification of the Ability of the Bispecific Antibody to Recognize CD3E and CD123 on Cell Surface 10.1 Identification of the ability of the bispecific antibody to recognize CD3E on the cell surface Jurkat-Dual cells (jktd-isnf, purchased from Invivogen) at the logarithmic phase of growth were used and resuspended to 2×10⁶ cells/well with PBS buffer containing 1% BSA after centrifugation. Jurkat-Dual cells were plated in a 96-well V-bottom plate at 100 µL/well, and the supernatant was removed after centrifugation. The control sample of the bispecific antibody Xmab14045, the anti-CD3E monoclonal antibody H3B8+L27E5, the irrelevant antibody HIgG (human IgG control (whole molecule), Purifie, A01006, GenScript) and the bispecific antibody CD3×CD123 (CD3×CD123 BsAb) were diluted with PBS buffer to total 8 concentrations with 400 nM as the starting concentration, followed by 2-fold dilution for the first 3 concentration points and 3-fold dilution for the last 5 concentration points. The antibodies were added to the wells containing cells and

TABLE 7

The affinity constants of the binding of the bispecific antibody CD3E × CD123 to CD3E

Figure 4:
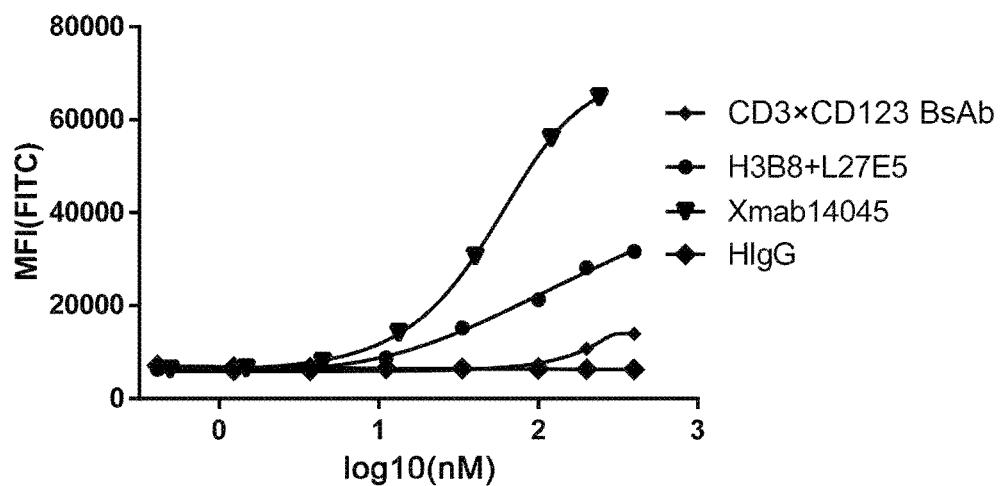
FIG. 4 shows the results of the ability of the bispecific antibody CD3E×CD123 to bind to CD3E on the surface of Jurkat-Dual cells analyzed by using flow cytometer.

|  | hCD3E-his | | | mfCD3E-his | | |
| --- | --- | --- | --- | --- | --- | --- |
|  | $K_{on}$ | $K_{off}$ | $K_D$ | $K_{on}$ | $K_{off}$ | $K_D$ |
| H3B8 + L27E5 | 5.607E+4 | 7.108E−4 | 1.268E−8 | 1.233E+5 | 6.492E−4 | 5.263E−9 |
| CD3 × CD123BsAb | 5.646E+4 | 7.967E−4 | 1.411E−8 | 1.368E+5 | 1.571E−3 | 1.149E−8 |
| Xmab14045 | 5.648E+5 | 3.674E−4 | 6.505E−10 | 8.633E+5 | 8.074E−4 | 9.352E−10 | incubated at 4° C. for 1 hour. Then, the plate was washed three times with 200 μL PBS buffer. The goat anti-human IgG-FITC secondary antibody (ZF-0308, ZSGB-BIO) was added to the wells (100 L/well), and incubated at 4° C. for 30 minutes in the dark. Then, the cells were washed three times with 200 μL of PBS buffer, and resuspended in 100 μL of PBS buffer to detect FITC channel by flow cytometer (ACEA, Novocyte). The results showed that the bispecific antibody CD3×CD123 could bind to CD3E on the surface of Jurkat-Dual cells, and the binding strength was weaker than that of the control sample Xmab14045, which is consistent with the affinity measurement results in Example 9 (FIG. 4).

Figure 5:
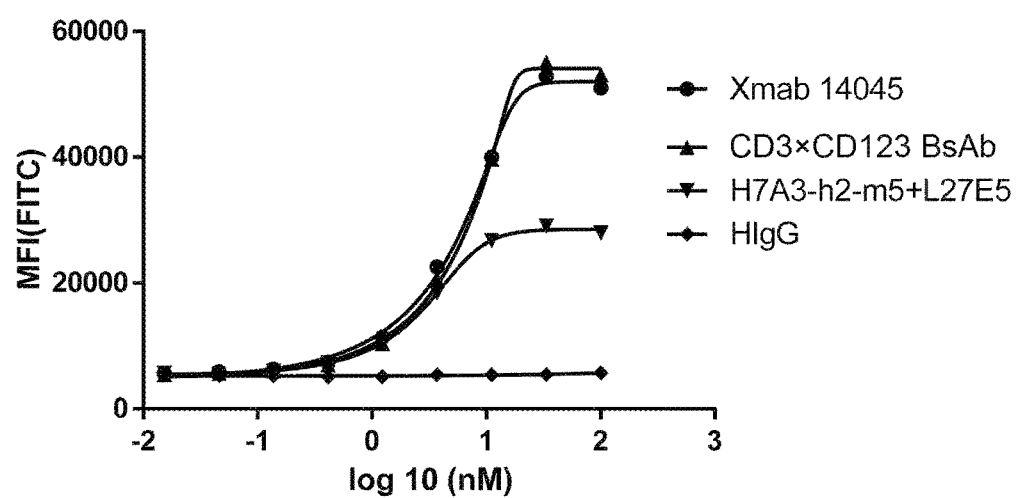
FIG. 5 shows the results of the ability of the bispecific antibody CD3E×CD123 to bind to CD123 on the surface of MV-4-11 cells analyzed by using flow cytometer.

10.2 Identification of the Ability of the Bispecific Antibody to Recognize CD123 on the Cell Surface MV-4-11 cells at the logarithmic phase of growth were used and resuspended to $2×10^6$ cells/well with PBS buffer containing 1% BSA after centrifugation. MV-4-11 cells were plated in a 96-well V-bottom plate at 100 μL/well, and the supernatant was removed after centrifugation. The control sample of the bispecific antibody Xmab14045, the anti-CD123 monoclonal antibody H7A3-h2-m5+L27E5, the bispecific antibody CD3×CD123 (CD3×CD123 BsAb) and the irrelevant antibody HIgG (human IgG control (whole molecule), Purifie, A01006, GenScript) were diluted with PBS buffer to total 9 concentrations with 100 nM as the starting concentration, followed by a 3-fold gradient dilution. The antibodies were added to the wells containing cells and incubated at 4° C. for 1 hour. Then, the plate was washed three times with 200 μL, PBS buffer. The goat anti-human IgG-FITC secondary antibody (ZF-0308, ZSGB-BIO) was added to the wells (100 μL/well), and incubated at 4° C. for 30 minutes in the dark. Then, the cells were washed three times with 200 μL of PBS buffer, and resuspended in 100 μL of PBS buffer to detect FITC channel by flow cytometer (ACEA, Novocyte). The results showed that the bispecific antibody CD3×CD123 could well bind to CD123 on the surface of CD123-positive MV-4-11 cells with a $K_D$ value of 7.08 nM, which was comparable to that of Xmab14045 ($K_D$=6.07 nM) (FIG. 5)

Figure 6:
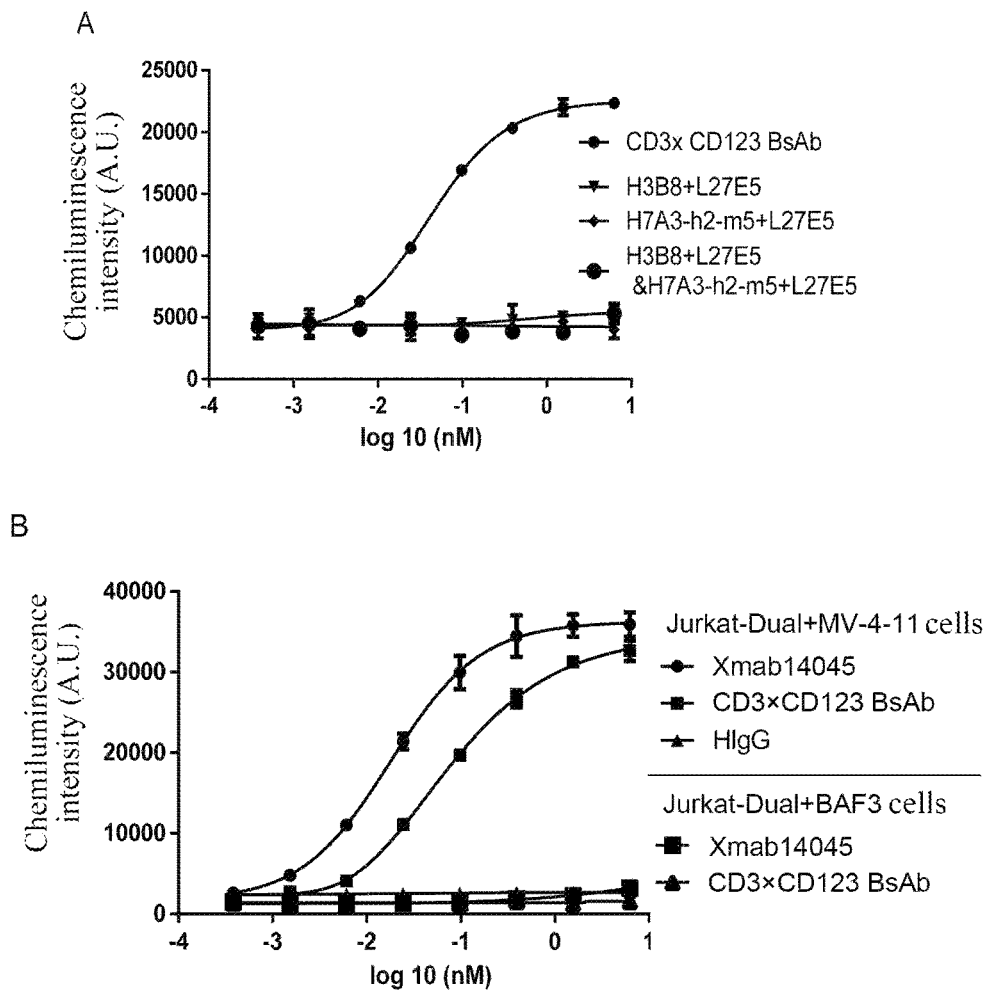
FIG. 6 shows the results of the activation of Jurkat-Dual cells by the bispecific antibody CD3×CD123 in the presence of CD123-positive tumor cells, in which Panel A shows the results of the activation of Jurkat-Dual cells by the bispecific antibody CD3×CD123, the anti-CD3E monoclonal antibody H3B8+L27E5, the anti-CD123 monoclonal antibody H7A3-h2-m5+L27E5, and a combination of the anti-CD3E monoclonal antibody H3B8+L27E5 and the anti-CD123 monoclonal antibody H7A3-h2-m5+L27E5; and Panel B shows the results of the activation of Jurkat-Dual cells by the bispecific antibody CD3×CD123, the control bispecific antibody Xmab14045 and HIgG in the presence of CD123-positive target cells, and the results of the activation of Jurkat-Dual cells by the bispecific antibody CD3×CD123 and the control bispecific antibody Xmab14045 in the presence of CD123-negative target cells.

Example 11: Specific Activation of Jurkat-Dual Cells Mediated by the Bispecific Antibody MV-4-11 cells (CD123+) at logarithmic phase of growth were collected. After centrifugation, the cells were resuspended with 1640 medium to $2×10^6$ cells/mL and plated in the cell plate at 50 μL/well. Jurkat-dual cells (purchased from Invivogen) at logarithmic phase of growth were collected, centrifugated, and resuspended with 1640 medium to $2×10^6$ cells/mL, and were added to the cell plate with 50 μL/well to obtain a final E:T ratio of 1:1. Then, total 8 concentrations of the bispecific antibody CD3×CD123 (CD3×CD123 BsAb, 50 μL/well) was added with 6 nM as the starting concentration, followed by a 4-fold gradient dilution. The control sample of the bispecific antibody Xmab14045, the anti-CD3E monoclonal antibody H3B8+L27E5, the anti-CD123 monoclonal antibody H7A3-h2-m5+L27E5, the combination of H3B8+L27E5 and H7A3-h2-m5+L27E5 (H3B8+L27E5&H7A3-h2-m5+L27E5), the CD123 negative target cells (BAF3 cells) and the irrelevant antibody HIgG (human IgG control (whole molecule), Purifie, A01006, GenScript) were set as controls, and the concentration of these controls was the same as that of the bispecific antibody CD3×CD123. After 20 hours of incubation, the supernatant was taken, and the specific activation of Jurkat-Dual cells mediated by tumor cells under different conditions was detected and analyzed according to the QUANTI-Luc™ instructions (QUANTI-Luc, Invivogen, rep-qlc2) (FIGS. 6A-B).

Example 12: The Expression of the Activation Molecules on the Surface of the Purified T Cells and the Killing of the CD123 Positive Tumor Cells Mediated by the Bispecific Antibody CD3×CD123

12.1 Isolation of Human Peripheral Blood Mononuclear Cells (PBMCs)

Blood (50 mL each) was collected from normal volunteers. All of the volunteers had signed informed consent. Inclusion criteria for volunteers were as follow:
1. Age older than 18 years;
2. No HIV and HBV infection;
3. Normal blood routine test;
4. Non-pregnant or non-lactating women.

PBMCs were isolated from whole blood of the volunteers using Ficoll density gradient centrifugation and were cultured in 1640 medium.

Figure 7:
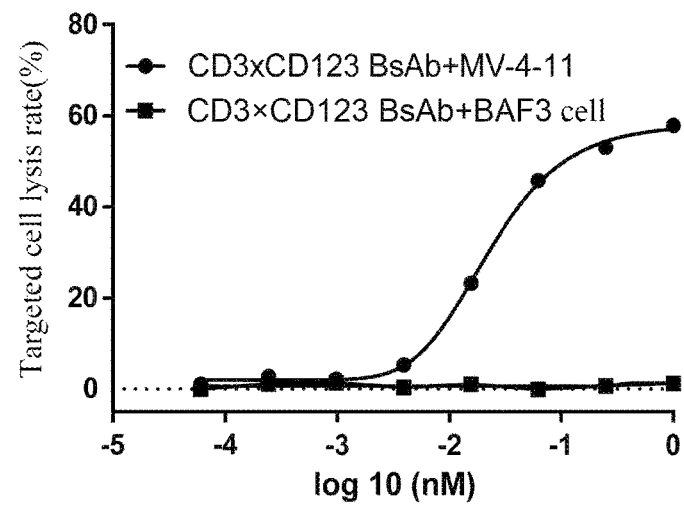
FIG. 7 shows the results of the killing of CD123-positive tumor cells by purified T cells mediated by the bispecific antibody CD3E×CD123.

12.2 Detection of the Killing of the Purified T Cells to the CD123 Positive Tumor Cells Mediated by Bispecific Antibody MV-4-11 cells ($CD123^+$ cells) at the logarithmic phase of growth were collected, centrifuged, and resuspended in 1640 medium to $1×10^6$ cells/mL, and were plated in cell plates at 50 μL/well. Then, total 8 concentrations of the bispecific antibody CD3×CD123 (CD3×CD123 BsAb, 50 μL/well) was added with 1 nM as the starting concentration, followed by a 4-fold gradient dilution. The purified T cells ($5×10^6$ cells/mL, 50 μL/well) were obtained by sorting from PBMCs according to the instructions of the T cell negative sorting kit (BD IMaq human T lymphocyte enrichment set-DM, 557874, BD), and the final effector to target ratio was 5:1. At the same time, a control with only target cells (MV-4-11 cells), a control with only effector cells (T), and a blank control with only medium were set, and the volume was filled to 150 μL with the medium. After 20 hours of incubation, the supernatant was taken. The killing rate of T cells to tumor cells mediated by the bispecific antibody CD3E×CD123 was detected and analyzed with reference to the instructions of the cytoTox96® Non-Radioactive Cytotoxicity Assay (G1780, Promega). The results showed that the bispecific antibody CD3×CD123 could specifically mediate the killing of CD123-positive tumor cells by T cells, but had no killing effect on CD123-negative tumor cells (BAF3 cells) (FIG. 7).

Figure 8:
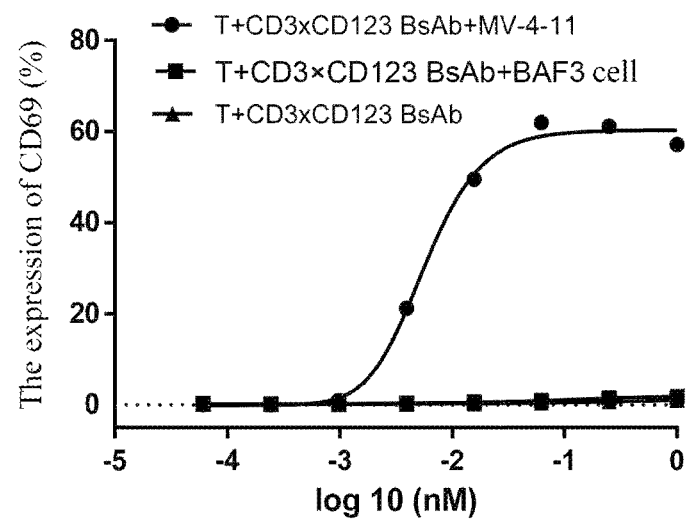
FIG. 8 shows the results of the specifical activation of T cells and the upregulated expression of CD69 by the bispecific antibody CD3E×CD123 in the presence of CD123-positive tumor cells detected by using flow cytometer.

12.3 Identification of the Expression of the Surface Activation Molecule after T Cells being Activated by the Bispecific Antibody In the section 12.2, the supernatant was removed and the cells were washed twice with PBS buffer, and incubated with the anti-human CD3-APC antibody (ebioscience, 17-0037-42) and the anti-human CD69-PE antibody (ebioscience, 11-0069-42) at 4° C. for 30 minutes in the dark. Then, the cells were washed twice with PBS buffer, resuspended in 100 μL PBS buffer, and loaded to the flow cytometer (ACEA, Novocyte) for detection to compare the expression difference of the activation marker CD69 in the CD3 positive cell population (MV-4-11 cells) before and after treated with the bispecific antibody CD3×CD123 (CD3×CD123 BsAb). The results showed that the bispecific antibody CD3×CD123 specifically up-regulated the expression of CD69 on the surface of T cells in the presence of positive tumor cells, while failing to up-regulate the expression of CD69 on the surface of T cells in the presence of CD123-negative tumor cells (BAF3 cells) (FIG. 8).

Example 13: Bispecific Antibody-Mediated Proliferation of T Cells In Vitro 13.1 Isolation of Human Peripheral Blood Mononuclear Cells (PBMCs)

PBMCs were obtained by sorting according to Example 12.1.

13.2 Bispecific Antibody-Mediated Proliferation of T Cells In Vitro

Figure 9:
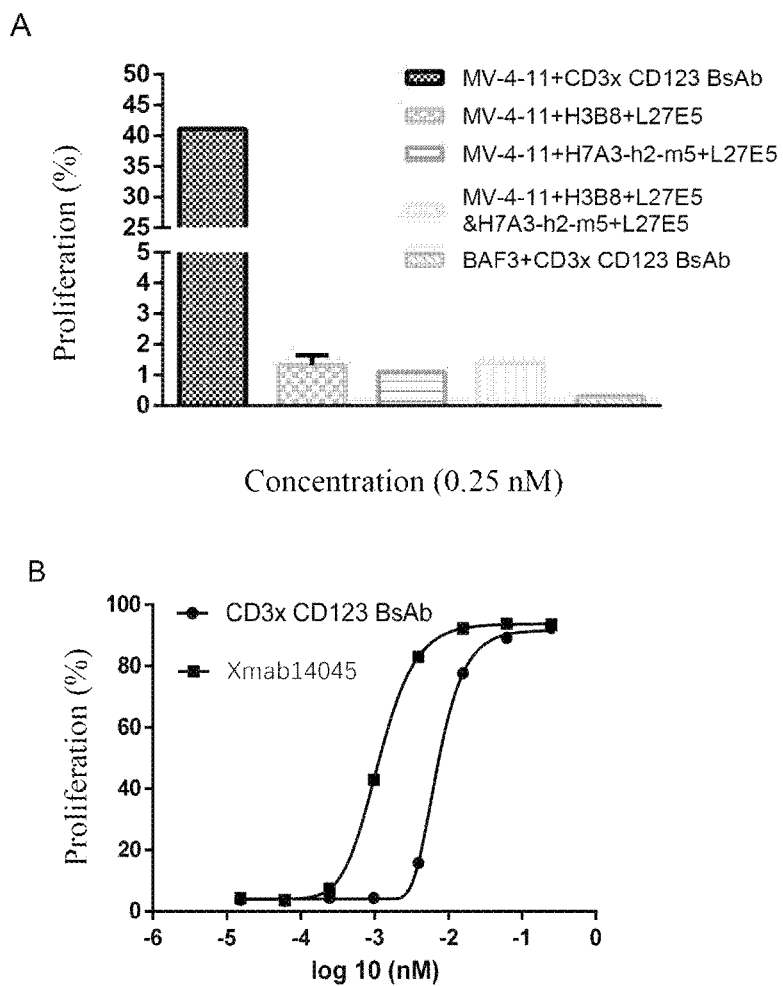
FIG. 9 shows the results of the proliferation of T cells promoted by the bispecific antibody CD3E×CD123 in the presence of CD123-positive tumor cells detected by using flow cytometer, in which Panel A shows the results of the proliferation of T cells promoted by the bispecific antibody CD3×CD123, the anti-CD3E monoclonal antibody H3B8+L27E5, the anti-CD123 monoclonal antibody H7A3-h2-m5+L27E5, and a combination of the anti-CD3E monoclonal antibody H3B8+L27E5 and the anti-CD123 monoclonal antibody H7A3-h2-m5+L27E5 in the presence of CD123-positive tumor cells; and Panel B shows the results of the proliferation of T cells promoted by the bispecific antibody CD3E×CD123 and the control bispecific antibody Xmab14045 in the presence of CD123-positive tumor cells.

The purified T cells were obtained by sorting from PBMCs according to the instructions of the T cell negative sorting kit (BD IMaq human T lymphocyte enrichment set-DM, 557874, BD). The purified T cells were stained with reference to CFSE staining instructions (CFSE, 65-0850-84, eBioscience), resuspended in 1640 medium to $2\times10^6$ cells/mL, and were added to the cell culture plate at 50 μL/well. MV-4-11 cells ($CD123^+$ cells) at logarithmic phase of growth were collected. After centrifugation, the cells were resuspended with 1640 medium to $5\times10^5$ cells/mL and plated in the cell plate at 50 μL/well. The final effector to target ratio was 4:1. Then, total 8 concentrations of the bispecific antibody CD3×CD123 (CD3×CD123 BsAb, 50 μL/well) and Xmab14045 were added with 0.25 nM as the starting concentration, followed by a 4-fold gradient dilution. Additionally, the anti-CD3E monoclonal antibody H3B8+L27E5 alone, the anti-CD123 monoclonal antibody H7A3-h2-m5+L27E5 alone, and the combination of H3B8+L27E5 and H7A3-h2-m5+L27E5 (H3B8+L27E5&H7A3-h2-m5+L27E5) were set as controls at the concentration of 0.25 nM. The bispecific antibody CD3×CD123 at a concentration of 0.25 nM in the presence of CD123-negative tumor cells (BAF3 cells) was also set as a control. After 5 days of incubation, the cells were washed twice with PBS buffer, and incubated with the anti-human CD3-APC antibody (ebioscience, 17-0037-42) at 4° C. for 30 minutes in the dark. Then, the cells were washed twice with PBS buffer, resuspended in 100 μL PBS buffer, and loaded to the flow cytometer (ACEA, Novocyte) to detect the proliferation of T cells (FIGS. 9A-B).

Example 14: Activity Identification of the Bispecific Antibody in a $CD34^+$ Mouse Model Forty-two (32 for grouping, and 10 for spare) female $hCD34^+$ humanized mice aged 20-24 weeks (purchased from Pharmalegacy (Shanghai)) were selected. 100 μL of $1\times10^7$ MV-4-11 cells and 100 μL of Matrigel were mixed well. Then the mixture was inoculated into the right side of the back of the mice via subcutaneous injection. The mice were anesthetized with 3-4% isoflurane before inoculation. When the average tumor volume reached to about 50-80 $mm^3$, 32 tumor-bearing mice were randomly divided into 4 groups according to the ratio of $hCD45^+$ in the peripheral blood and the tumor volume, with 8 mice in each group. The day of grouping and administration was defined as day 0. The test groups were divided into 4 groups: 3 groups of the bispecific antibody CD3E×CD123 at the concentrations of 0.01 mg/kg, 0.1 mg/kg and 0.5 mg/kg, respectively; and the negative control group (IgG1m3, 0.5 mg/kg). Each group consisted of 8 mice. The antibodies were administered via tail vein injection with a total of 5 times at days 0, 3, 7, 14 and 21. The therapeutic effects were evaluated according to the relative tumor growth inhibition value (TGI), and the safety was evaluated according to the body weight change and death of mice.

Figure 10:
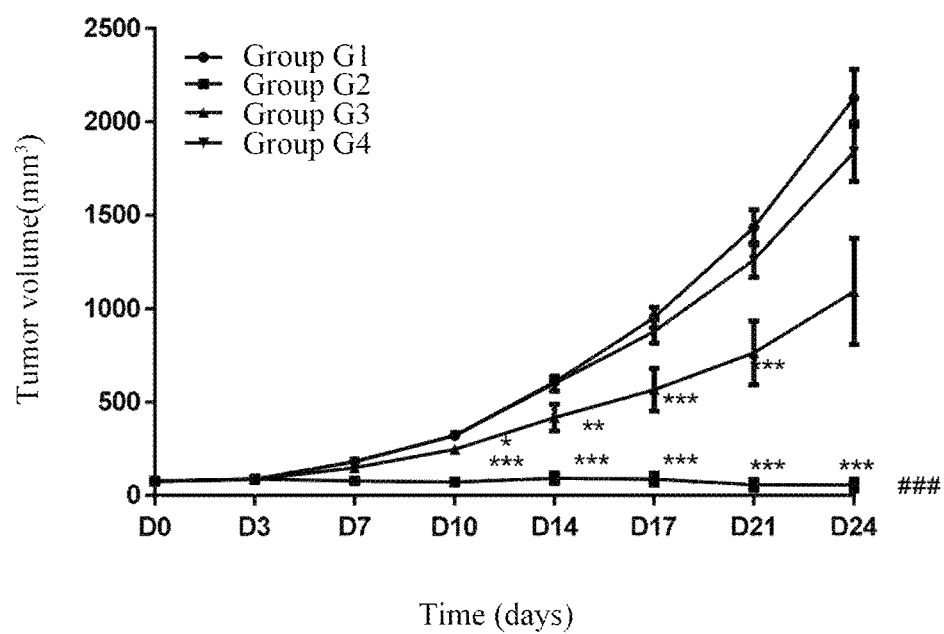
FIG. 10 shows the changes in tumor volume of hCD34+ humanized model mouse with MV-4-11 cells treated with the bispecific antibody CD3E×CD123.

During the experiment, the animals were generally in good mental states. At the end of the in vivo experiment (day 24), there was no significant difference in body weight ($P>0.05$) in the administration group compared with the negative control group (IgG1m3, i.v., 0.5 mg/kg, group G1). Compared with the negative control group (group G1) in the same period, the bispecific antibody CD3×CD123 at a dose of 0.5 mg/kg (group G2) significantly inhibited tumor growth, with a relative tumor inhibition rate TGI (%) of 97.35%, and 6 animals had almost complete tumor regression. There was a very significant difference between group G2 and group G1 ($p<0.001$). Compared with the negative control group (group G1) in the same period, after administration of the bispecific antibody CD3×CD123 at a dose of 0.1 mg/kg to the animals (group G3), the tumor volume increased slowly, and the relative tumor inhibition rate TGI (%) was 52.08%. There was a very significant difference between group G3 and group G1 ($p<0.05$). G4 was the group of the bispecific antibody CD3×CD123 at a dose of 0.01 mg/kg. The bispecific antibody CD3×CD123 had an obvious dose-effect relationship with tumor growth. The tumor growth of each group of animals at each time point was shown in FIG. 10. Among them, when compared with group G1, when using one-way ANOVA/Dunnett t test statistics, * represents $P<0.05$,  represents $P<0.01$, * represents $P<0.001$; when using repeated measures/Bonferroni correction statistics, ### represents $P<0.001$.

Although the present application has been described in detail with reference to the general description and specific embodiments, it will be apparent to those skilled in the art that modifications or improvements can be made to the present invention on the basis of the present application. Accordingly, all these modifications or improvements made without departing from the spirit of the present application will fall within the scope of the invention as claimed.

What is claimed is:

1. A bispecific antibody comprising an antigen-binding portion against human CD3E, wherein the antigen-binding portion against human CD3E comprises:
   HCDR1 as set forth in SEQ ID NO: 1,
   HCDR2 as set forth in SEQ ID NO:2,
   HCDR3 as set forth in SEQ ID NO:3,
   LCDR1 as set forth in SEQ ID NO:4,
   LCDR2 as set forth in SEQ ID NO:5, and
   LCDR3 as set forth in SEQ ID NO:6;
   wherein HCDRs and LCDRs are defined according to Kabat.

2. A bispecific antibody comprising an antigen-binding portion against human CD123, wherein the antigen-binding portion against human CD123 comprises:
   HCDR1 as set forth in SEQ ID NO:7,
   HCDR2 as set forth in SEQ ID NO:8,
   HCDR3 as set forth in SEQ ID NO:9,
   LCDR1 as set forth in SEQ ID NO:4,
   LCDR2 as set forth in SEQ ID NO:5, and
   LCDR3 as set forth in SEQ ID NO: 6;

wherein HCDRs and LCDRs are defined according to Kabat.

3. A bispecific antibody comprising an antigen-binding portion against human CD3E and an antigen-binding portion against human CD123,
wherein the antigen-binding portion against human CD3E comprises:
HCDR1 as set forth in SEQ ID NO: 1,
HCDR2 as set forth in SEQ ID NO:2,
HCDR3 as set forth in SEQ ID NO: 3,
LCDR1 as set forth in SEQ ID NO:4,
LCDR2 as set forth in SEQ ID NO:5, and
LCDR3 as set forth in SEQ ID NO:6; and
wherein the antigen-binding portion against human CD123 comprises:
HCDR1 as set forth in SEQ ID NO:7,
HCDR2 as set forth in SEQ ID NO: 8,
HCDR3 as set forth in SEQ ID NO: 9,
LCDR1 as set forth in SEQ ID NO:4,
LCDR2 as set forth in SEQ ID NO: 5, and
LCDR3 as set forth in SEQ ID NO:6;
wherein HCDRs and LCDRs are defined according to Kabat.

4. The bispecific antibody of claim 3, wherein the antigen-binding portion against human CD3E and the antigen-binding portion against human CD123 comprise the same light chain variable region.

5. The bispecific antibody of claim 4, wherein the antigen-binding portion against human CD3E and the antigen-binding portion against human CD123 comprise the same light chain.

6. The bispecific antibody of claim 3, wherein the bispecific antibody is an IgG1 antibody comprising a first heavy chain constant region and a second heavy chain constant region,
wherein the first heavy chain constant region comprises a C at amino acid position 354 and a W at amino acid position 366, and the second heavy chain constant region comprises a C at amino acid position 349, and S at amino acid position 366, and A at amino acid position 368, and a V at amino acid position 407;
wherein the amino acid positions of the antibody constant region are determined according to EU numbering.

7. The bispecific antibody of claim 3, wherein the antigen-binding portion against human CD3E comprises a heavy chain variable region as set forth in SEQ ID NO: 11 and a light chain variable region as set forth in SEQ ID NO:12.

8. The bispecific antibody of claim 3, wherein the antigen-binding portion against human CD3E and/or the antigen-binding portion against human CD123 comprise(s) a single chain fragment variable (scFv) or a Fab fragment.

9. The bispecific antibody of claim 3, wherein the antibody has a first arm and a second arm, wherein the first arm comprises an antigen-binding portion against human CD3E and the second arm comprises an antigen-binding portion against human CD123:
the first arm comprises the amino acid sequence of the heavy chain variable region as set forth in SEQ ID NO: 11, the amino acid sequence of the heavy chain constant region as set forth in SEQ ID NO:31, the amino acid sequence of the light chain variable region as set forth in SEQ ID NO: 12, and the amino acid sequence of the light chain constant region as set forth in SEQ ID NO:32;
the second arm comprises the amino acid sequence of the heavy chain variable region as set forth in SEQ ID NO: 13, the amino acid sequence of the heavy chain constant region as set forth in SEQ ID NO:30, the amino acid sequence of the light chain variable region as set forth in SEQ ID NO: 12, and the amino acid sequence of the light chain constant region as set forth in SEQ ID NO:32.

10. The bispecific antibody of claim 3, wherein the bispecific antibody is an IgG1 antibody comprising two heavy chain constant regions having the same hinge region, and the amino acid sequence of the hinge region is set forth in SEQ ID NO:10.

11. The bispecific antibody of claim 3, wherein the bispecific antibody is an IgG1 antibody comprising a first heavy chain constant region and a second heavy chain constant region,
wherein the amino acids at positions 234, 235 and 331 of the first and second heavy chain constant regions are F, E and S, respectively;
wherein the amino acid positions of the antibody constant region are determined according to EU numbering.

12. The bispecific antibody of claim 3, wherein the antigen-binding portion against human CD123 comprises a heavy chain variable region as set forth in SEQ ID NO: 13 and a light chain variable region as set forth in SEQ ID NO:12.

13. The bispecific antibody of claim 3, wherein the antigen-binding portion against human CD3E comprises a Fab fragment and the antigen-binding portion against human CD123 comprises a Fab fragment; or
the antigen-binding portion against human CD3E comprises a Fab fragment, and the antigen-binding portion against human CD123 comprises a single chain fragment variable (scFv); or
the antigen-binding portion against human CD3E comprises a single chain fragment variable (scFv), and the antigen-binding portion against human CD123 comprises a Fab fragment; or
the antigen-binding portion against human CD3E comprises a single chain fragment variable (scFv), and the antigen-binding portion against human CD123 comprises a single chain fragment variable (scFv).

14. A pharmaceutical composition comprising the bispecific antibody of claim 3.

15. The pharmaceutical composition of claim 14, wherein the pharmaceutical composition is for use in t treatment of a CD123-positive tumor.

16. The pharmaceutical composition of claim 15, wherein the CD123-positive tumor is selected from the group consisting of acute myeloid leukemia (AML) and blastic plasmacytoid dendritic cell tumors (BPDCN).

17. A method of treating a CD123-positive tumor comprising administering to a subject in need thereof the bispecific antibody of claim 3.

18. The method of claim 17, wherein the CD123-positive tumor is selected from the group consisting of acute myeloid leukemia (AML) and blastic plasmacytoid dendritic cell tumors (BPDCN).

* * * * *